US011092734B2

(12) United States Patent
Hwang et al.

(10) Patent No.: US 11,092,734 B2
(45) Date of Patent: *Aug. 17, 2021

(54) OPTICAL MEMBER AND DISPLAY DEVICE INCLUDING THE SAME

(71) Applicant: Samsung Display Co., Ltd., Yongin-si (KR)

(72) Inventors: Seong Yong Hwang, Hwaseong-si (KR); Young Min Park, Hwaseong-si (KR); Ju Young Yoon, Seoul (KR); Sung Kyu Shim, Seoul (KR); Sang Won Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,882

(22) Filed: Jun. 22, 2020

(65) Prior Publication Data

US 2020/0319394 A1    Oct. 8, 2020

Related U.S. Application Data

(63) Continuation of application No. 16/503,195, filed on Jul. 3, 2019, now Pat. No. 10,690,835, which is a (Continued)

(30) Foreign Application Priority Data

Sep. 8, 2017    (KR) .................. 10-2017-0115283

(51) Int. Cl.
  *F21V 8/00*    (2006.01)
(52) U.S. Cl.
  CPC ........... *G02B 6/0061* (2013.01); *G02B 6/005* (2013.01); *G02B 6/0035* (2013.01);
  (Continued)

(58) Field of Classification Search
  CPC .... G02B 6/0061; G02B 6/005; G02B 6/0093; G02B 6/0035; G02B 6/0055;
  (Continued)

(56) References Cited

U.S. PATENT DOCUMENTS

| 9,199,842 | B2 | 12/2015 | Dubrow et al. |
| 2004/0022050 | A1 | 2/2004 | Yamashita et al. |
| 2007/0131867 | A1 | 6/2007 | Okada et al. |
| 2007/0189352 | A1 | 8/2007 | Nagahama et al. |
| 2008/0101088 | A1 | 5/2008 | Kim et al. |

(Continued)

FOREIGN PATENT DOCUMENTS

| KR | 10-0862667 | 10/2008 |
| KR | 10-2013-0120486 | 11/2013 |
| KR | 10-2017-0044791 | 4/2017 |

OTHER PUBLICATIONS

Notice of Allowance dated Mar. 22, 2019 in U.S. Appl. No. 16/111,215.
(Continued)

*Primary Examiner* — Donald L Raleigh
(74) *Attorney, Agent, or Firm* — H.C. Park & Associates, PLC

(57) ABSTRACT

An optical member and a display device including the same. The optical member includes a light guide plate including a surface disposed on a plane defined by a first direction and a second direction crossing the first direction, a low refractive index pattern disposed on the surface of the light guide plate and including an opening for exposing the surface of the light guide plate, a wavelength conversion layer disposed on the low refractive index pattern, and a passivation layer disposed on the wavelength conversion layer and covering a side surface of the wavelength conversion layer and a side surface of the low refractive index pattern at least one side portion. The low refractive index pattern has a lower index of refraction than the light guide plate, and a ratio of an area occupied by the low refractive index pattern
(Continued)

to an area of the surface of the light guide plate decreases in the first direction.

19 Claims, 22 Drawing Sheets

Related U.S. Application Data continuation of application No. 16/111,215, filed on Aug. 24, 2018, now Pat. No. 10,371,881.

(52) U.S. Cl.
CPC ......... G02B 6/0055 (2013.01); G02B 6/0093 (2013.01); *G02B 6/0043* (2013.01); *G02B 6/0068* (2013.01)

(58) Field of Classification Search
CPC .. G02B 6/0068; G02B 6/0043; G02B 6/0011; G02F 1/133615; G02F 1/133614
See application file for complete search history.

(56) References Cited

U.S. PATENT DOCUMENTS

| | | |
|---|---|---|
| 2011/0044046 A1 | 2/2011 | Abu-Ageel |
| 2016/0025920 A1 | 1/2016 | Oh et al. |
| 2017/0138567 A1 | 5/2017 | Yoon et al. |
| 2018/0364408 A1 | 12/2018 | Hwang et al. |

OTHER PUBLICATIONS

Notice of Allowance dated Feb. 13, 2020, in U.S. Appl. No. 16/503,195.

OPTICAL MEMBER AND DISPLAY DEVICE INCLUDING THE SAME

CROSS REFERENCE TO RELATED APPLICATIONS

This application is a Continuation of U.S. patent application Ser. No. 16/503,195, filed Jul. 3, 2019, which is a Continuation of U.S. patent application Ser. No. 16/111,215, filed Aug. 24, 2018, issued as U.S. Pat. No. 10,371,881, and claims priority from and the benefit of Korean Patent Application No. 10-2017-0115283, filed on Sep. 8, 2017, each of which is hereby incorporated by reference for all purposes as if fully set forth herein.

BACKGROUND

Field

Exemplary embodiments of the inventive concepts relate to an optical member and a display device including the same.

Discussion of the Background

A liquid crystal display device receives light from a backlight assembly and displays an image. Some backlight assemblies include a light source and a light guide plate. A light guide plate receives light from a light source and guides the light in a propagation direction toward a display panel. Some products have a light source for providing white light and represent colors by filtering the white light with a color filter included in a display panel.

Recently, research has been conducted on the application of a wavelength conversion film to improve image quality such as color reproducibility of a liquid crystal display device. Typically, a blue light source is used as a light source and a wavelength conversion file is disposed on a light guide plate to convert blue light into a white color. The wavelength conversion film includes wavelength conversion particles, and the wavelength conversion particles are generally vulnerable to moisture, and thus, are protected by a barrier film. However, a barrier film is expensive and may cause an increase in thickness. Further, since a wavelength conversion film should be stacked on a light guide plate, a complicated assembly process may be required.

The above information disclosed in this Background section is only for understanding of the background of the inventive concepts, and, therefore, it may contain information that does not constitute prior art.

SUMMARY

Exemplary embodiments of the inventive concepts provide an optical member having a light guide function and a sealed wavelength conversion layer.

Exemplary embodiments of the inventive concepts also provide a display device including an optical member having a light guide function and a sealed wavelength conversion layer.

Additional features of the inventive concepts will be set forth in the description which follows, and in part will be apparent from the description, or may be learned by practice of the inventive concepts.

An exemplary embodiment discloses an optical member including a light guide plate including a surface disposed on a plane defined by a first direction and a second direction crossing the first direction, a low refractive index pattern disposed on the surface of the light guide plate and including an opening for exposing the surface of the light guide plate, a wavelength conversion layer disposed on the low refractive index pattern, and a passivation layer disposed on the wavelength conversion layer and configured to cover a side surface of the wavelength conversion layer and a side surface of the low refractive index pattern at at least one side portion. The low refractive index pattern has a lower index of refraction than the light guide plate, and a ratio of an area occupied by the low refractive index pattern to an area of the surface of the light guide plate decreases in the first direction.

An exemplary embodiment also discloses an optical member including a light guide plate including a surface, a first side surface crossing the surface, and a second surface opposite the first side surface, a low refractive index pattern disposed on the surface of the light guide plate and including an opening for exposing the surface of the light guide plate, a wavelength conversion layer disposed on the low refractive index pattern, and a passivation layer disposed on the wavelength conversion layer and configured to cover a side surface of the wavelength conversion layer and a side surface of the low refractive index pattern at at least one side portion. The low refractive index pattern has a lower index of refraction than the light guide plate, and a ratio of an area occupied by the low refractive index pattern to an area of the surface of the light guide plate decreases in a direction away from the first side surface.

An exemplary embodiment also discloses a display device including an optical member including a light guide plate including a light incidence surface, a low refractive index layer disposed on the light guide plate and having a lower index of refraction than the light guide plate, a wavelength conversion layer disposed on the low refractive index layer, and a passivation layer disposed on the wavelength conversion layer and configured to cover a side surface of the wavelength conversion layer and a side surface of the low refractive index layer at at least one side portion, a light source disposed at a side of the light incidence surface of the light guide plate, and a display panel disposed on the optical member. An area in which the low refractive index layer is disposed decreases in a direction away from the light incidence surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE ILLUSTRATED EMBODIMENTS

Figure 1:
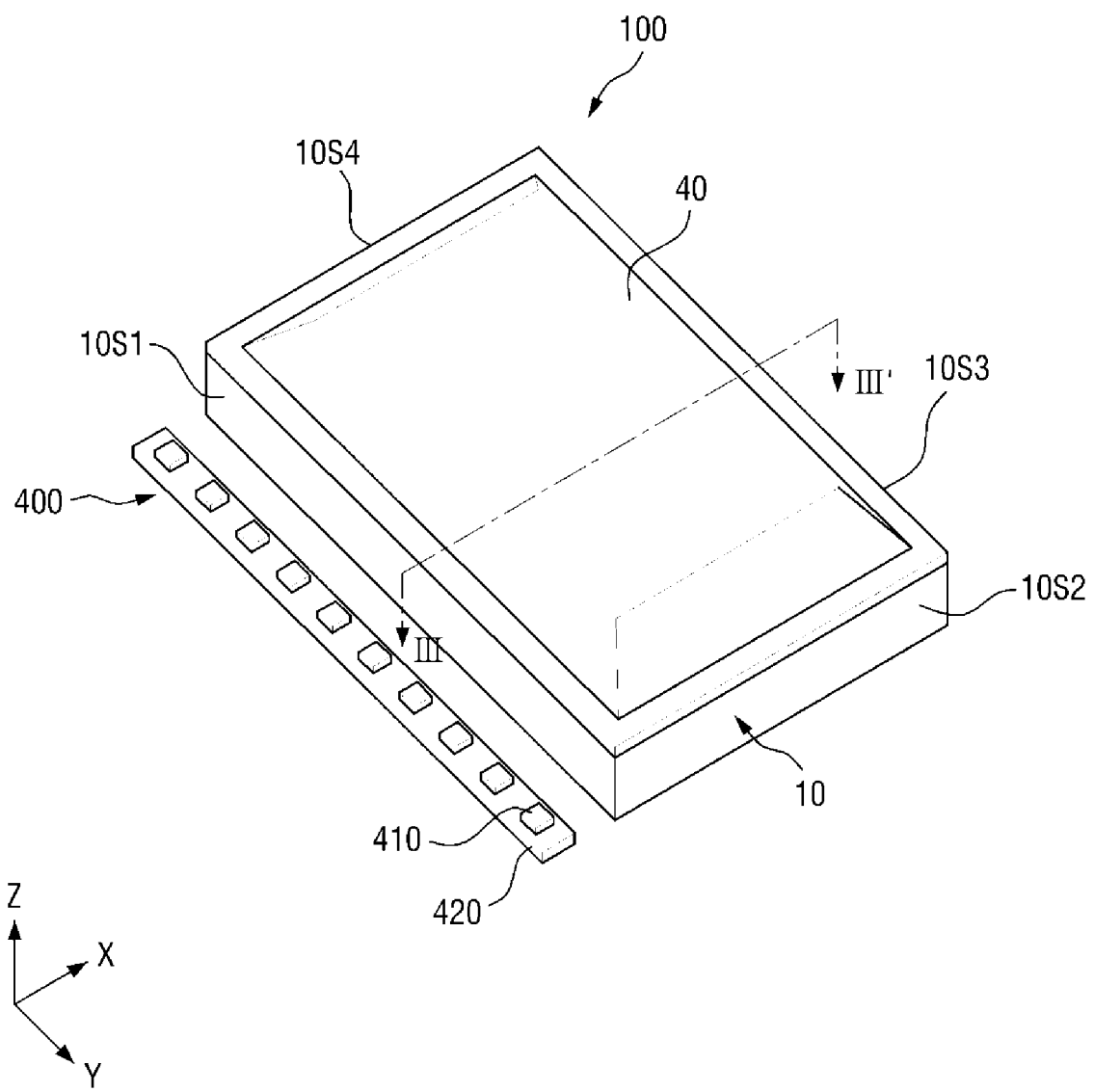
FIG. 1 is a perspective view of an optical member and a light source according to an exemplary embodiment.

In the following description, for the purposes of explanation, numerous specific details are set forth in order to provide a thorough understanding of various exemplary embodiments of the invention. As used herein, "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined within the scope of the appended claims.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present invention Hereinafter, exemplary embodiments will be described with reference to the accompanying drawings.

Figure 2:
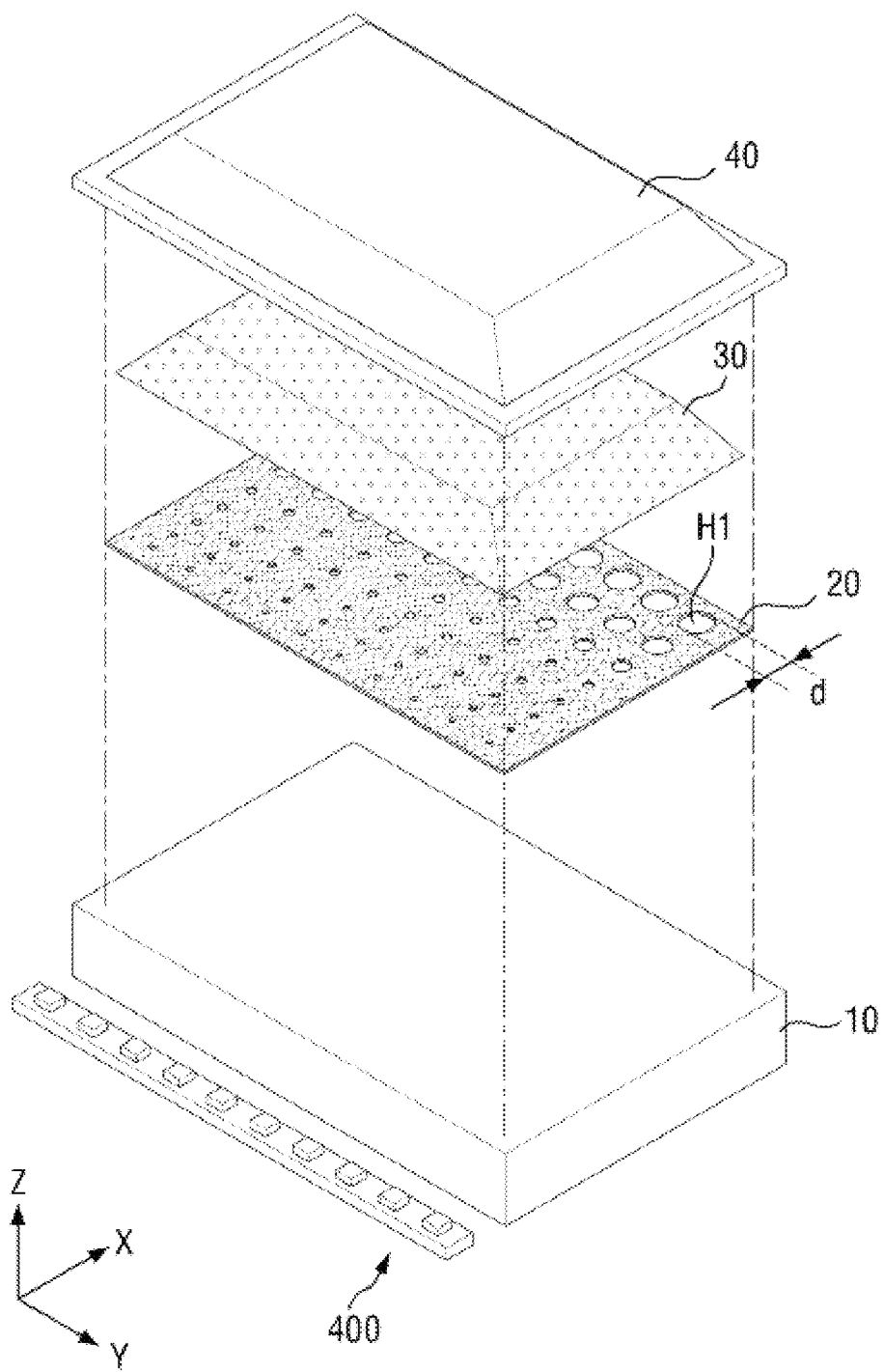
FIG. 2 is an exploded perspective view of an optical member according to an exemplary embodiment.
Figure 3:
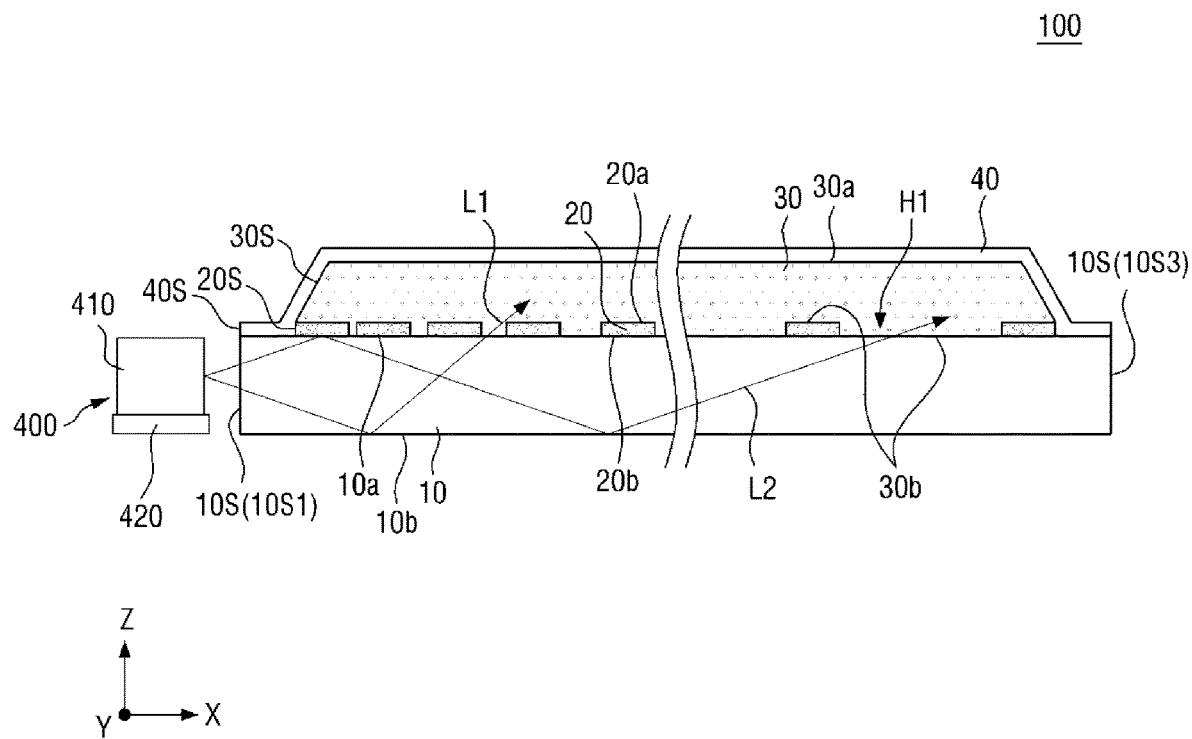
FIG. 3 is a sectional view taken along line of FIG. 1.

FIG. 1 is a perspective view of an optical member and a light source according to an exemplary embodiment. FIG. 2 is an exploded perspective view of an optical member according to an exemplary embodiment. FIG. 3 is a sectional view taken along line of FIG. 1.

Referring to FIGS. 1 to 3, an optical member 100 includes a light guide plate 10, a low refractive index pattern 20 disposed on the light guide plate 10, and a wavelength conversion layer 30 disposed on the low refractive index pattern 20, and a passivation layer 40 disposed on the wavelength conversion layer 30. The light guide plate 10, the low refractive index pattern 20, the wavelength conversion layer 30, and the passivation layer 40 may be integrated and combined.

The light guide plate 10 serves to guide a light propagation path. Generally, the light guide plate 10 may have a polygonal prism shape. A planar shape of the light guide plate 10 may be a rectangle having two short sides disposed in a first direction X and two long sides disposed in a second direction Y, but the inventive concepts are not limited thereto. For example, the light guide plate 10 may have a quadrangular prism shape including a rectangle as the planar shape, and may include an upper surface 10a, a lower surface 10b, and four side surfaces 10S (10S1, 10S2, 10S3, and 10S4). In this specification and the accompanying drawings, the reference symbols "10S1," "10S2," "10S3," and "10S4" are used to distinguish the four side surfaces, and the reference symbol "10S" is used to simply refer to one side surface.

For example, the upper surface 10a and the lower surface 10b of the light guide plate 10 may be located on a plane defined by the first direction X and the second direction Y, and the light guide plate 10 may have an entirely uniform thickness. However, the inventive concepts are not limited thereto, the upper surface 10a or the lower surface 10b may be composed of a plurality of planes, and a plane on which the upper surface 10a is located and a plane on which the lower surface 10b is located may intersect. For example, the light guide plate 10 may have a thickness decreasing from a first side surface (e.g., a light incidence surface) to a second side surface opposite the first side surface (e.g., an opposite surface) like a wedge-type light guide plate. Also, the light guide plate 10 may be formed to have a shape in which the lower surface 10b is upwardly inclined near the first surface (e.g., the light incidence surface) up to a specific point so that the upper surface 10a and the lower surface 10b become flat and then the thickness decreases toward the second side surface (e.g., the opposite surface) opposite the first side surface.

The plane on which the upper surface 10a and/or the lower surface 10b are located may be inclined at about 90 degrees with respect to the plane on which the side surface 10S is located. However, the inventive concepts are not limited thereto, and an inclined corner may be further included between the upper surface 10a and the side surface 10S and/or between the lower surface 10b and the side surface 10S.

As an application of the optical member 100, a light source 400 may be disposed adjacent to at least one side surface 10S of the light guide plate 10. In the drawings, a plurality of LED light sources 410 mounted on a printed circuit board 420 are disposed at the side surface 10S1 located at one long side of the light guide plate 10, but are not limited thereto. For example, the plurality of LED light sources 410 may be disposed adjacent to each other at the side surfaces 10S1 and 10S3 of both the long sides or may be disposed adjacent to each other at the side surfaces 10S2 and 10S4 of one or both of the short sides. In the exemplary embodiment of FIG. 1, the side surface 10S1 of one long side of the light guide plate 10 at which the LED light sources 410 are disposed adjacent to each other is defined as a light incidence surface (depicted as "10S1" herein for convenience of description) on which light of the light source 400 is directly incident, and the side surface 10S1 of the other long side of the light guide plate 10 opposite the one side is defined as an opposite surface (depicted as "10S3" herein for convenience of description).

The light guide plate 10 may include an inorganic material. For example, the light guide plate 10 may be made of glass, but is not limited thereto.

The low refractive index pattern 20 is disposed on the upper surface 10a of the light guide plate 10. The low refractive index pattern 20 may be directly formed on the upper surface 10a of the light guide plate 10 to be in contact therewith. The upper surface 10a of the light guide plate 10 at which the low refractive index pattern 20 is not disposed is exposed to the wavelength conversion layer 30. That is, the upper surface 10a of the light guide plate 10 at which the low refractive index pattern 20 is not disposed may be in contact with the wavelength conversion layer 30. Sufficient total reflection may occur on the upper surface 10a of the light guide plate 10 in contact with the low refractive index pattern 20.

In more detail, effective internal total reflection should occur on the upper surface 10a and the lower surface 10b of the light guide plate 10 in order to perform efficient light guiding from the light incidence surface 10S1 to the opposite surface 10S3 by the light guide plate 10. One condition for the internal total reflection occurring in the light guide plate 10 is that the light guide plate 10 has a greater refractive index than a medium forming an optical interface with the light guide plate 10. As the refractive index of the medium forming the optical interface with the light guide plate 10 decreases, the internal total reflection may increase due to a decrease in a critical angle for total reflection.

The case in which the light guide plate 10 is formed of glass having a refractive index of about 1.5 will be described as an example. In this case, the wavelength conversion layer 30 stacked on the upper surface 10a of the light guide plate 10 typically has a refractive index of about 1.5. When the wavelength conversion layer 30 is directly stacked on the upper surface 10a of the light guide plate 10, it is difficult for sufficient total reflection to occur on the upper surface 10a of the light guide plate 10. Light L1 incident on an optical interface formed between the wavelength conversion layer 30 and the light guide plate 10 is not totally reflected, but is instead emitted through the upper surface 10a of the light guide plate 10. On the other hand, the low refractive index pattern 20 forming an interface with the upper surface 10a of the light guide plate 10 has a lower index of refraction than the light guide plate 10, and thus, total reflection occurs in a region in which the low refractive index pattern 20 is disposed. That is, light L2 incident on an optical interface formed between the low refractive index pattern 20 and the light guide plate 10 is totally reflected to travel toward the opposite surface 10S3. Total reflection occurs at a relatively high rate in a region in which the light guide plate 10 and the low refractive index pattern 20 are in direct contact with each other, and occurs at a relatively low rate in a region in which the light guide plate 10 and the wavelength conversion layer 30 are in direct contact with each other. In this regard, it is possible to increase total reflection efficiency by increasing an area occupied by the low refractive index pattern 20 such that total reflection may occur at a relatively high rate. For example, a ratio of the area occupied by the low refractive index pattern 20 to the upper surface 10a of the light guide plate 10 may be high near the light incidence surface 10S1 having a more sufficient amount of light than the opposite surface 10S3.

In detail, light from the light source 400 is directly incident on an area adjacent to the light incidence surface 10S1 of the light guide plate 10, and thus, there is a sufficient amount of guided light. On the other hand, in an area adjacent to the opposite surface 10S3 of the light guide plate 10, most of the light travels by total reflection in the light guide plate 10, and there is a smaller amount of guided light than that of the light incidence surface 10S1. Thus, the amount of light entering the upper surface 10a of the light guide plate 10 is relatively large near the light incidence surface 10S1, and the amount of light entering the upper surface 10a of the light guide plate 10 is relatively lacking near the opposite surface 10S3. When the low refractive index pattern 20 is disposed on the entirety of the upper surface 10a of the light guide plate 10 at the same area ratio per unit area, the amount of light emitted through the upper surface 10a of the light guide plate 10 near the light incidence surface 10S1 may be greater than the amount of light emitted near the opposite surface 10S2. In this case, in terms of a display surface, a luminance non-uniformity phenomenon may occur, in which a region in which the light source 400 is disposed is recognized as being relatively bright. It is possible to improve brightness uniformity by adjusting a direct contact ratio between the low refractive index pattern 20 and the light guide plate 10 depending on the amount of light guided in the light guide plate 10.

In detail, near the light incidence surface 10S1 in which the amount of light guided in the light guide plate 10 is sufficient, the amount of totally reflected light is increased by increasing the area of the upper surface 10a of the light guide plate 10 occupied by the low refractive index pattern 20 over the area of the upper surface 10a of the light guide plate 10 occupied by the wavelength conversion layer 30. On the other hand, near the opposite surface 10S3 in which the amount of light guided in the light guide plate 10 is small, the area occupied by the low refractive index pattern 20 is decreased, and the region in which the light guide plate 10 and the wavelength conversion layer 30 are in direct contact with each other is increased. In the region in which the wavelength conversion layer 30 and the light guide plate 10 are in contact with each other, light is not totally reflected but is emitted through the upper surface 10a of the light guide plate 10. As a result, the amount of emitted light is small compared to the amount of guided light near the light incidence surface 10S1 and the amount of emitted light is large compared to the amount of guided light near the opposite surface 10S3, and thus, the amount of light emitted through the entirety of the upper surface 10a of the light guide plate 10 is uniform. Since light is uniformly emitted from the upper surface 10a of the light guide plate 10, luminance uniformity can be improved.

The luminance uniformity may be improved by forming a scattering pattern (not shown) having a different arrangement density on the lower surface 10b of the light guide plate 10. In this case, however, costs may increase due to a process of forming the scattering pattern, and also it may be difficult to sufficiently reduce the thickness of the display device because a thickness of the optical member 100 is increased by the scattering pattern. On the other hand, it is possible to enable process simplification and maintain a reduced thickness of the optical member 100 when the luminance uniformity is improved by adjusting the ratio of direct contact between the low refractive index pattern 20 and the light guide plate 10 depending on the amount of light guided in the light guide plate 10. The shape of the low refractive index pattern 20 will be described in detail below.

The refractive index of the light guide plate 10 and the refractive index of the low refractive index pattern 20 may have a difference of 0.2 or more. When the refractive index of the low refractive index pattern 20 is lower than the refractive index of the light guide plate 10 by 0.2 or more, sufficient total reflection may occur through the upper surface 10a of the light guide plate 10. A maximum difference between the refractive index of the light guide plate 10 and the refractive index of the low refractive index pattern 20 is not particularly limited. However, the maximum difference may be less than or equal to 1 in consideration of the material of the light guide plate 10 and the refractive index of the low refractive index pattern 20 which are typically applied.

The refractive index of the low refractive index pattern 20 may range from 1.2 to 1.4, and preferably from 1.2 to 1.3. Generally, as a solid medium is manufactured to have a refractive index closer to 1, a manufacturing cost thereof exponentially increases. When the refractive index of the low refractive index pattern 20 is greater than or equal to 1.2, it is possible to prevent an excessive increase in the manufacturing cost. Also, when the refractive index of the low refractive index pattern 20 is less than or equal to 1.4, it is advantageous for sufficiently reducing a critical angle for total reflection of the upper surface 10a of the light guide plate 10. When the refractive index of the low refractive index pattern 20 is less than or equal to 1.3, the difference between the refractive index of the low refractive index pattern 20 and the refractive index of the light guide plate 10 further increases, and thus, the critical angle for total reflection of the upper surface 10a of the light guide plate 10 further decreases. Thus, it is possible for total reflection to more effectively occur through the upper surface 10a of the light guide plate 10.

For example, the low refractive index pattern 20 having a refractive index of about 1.25 may be applied.

The low refractive index pattern 20 may include a void in order to have the above-described low refractive index. The void may be made to be in a vacuum or filled with an air layer, gas, or the like. A space of the void may be defined by a particle, a matrix, or the like. This will be described in detail with reference to FIGS. 4 and 5.

Figure 4:
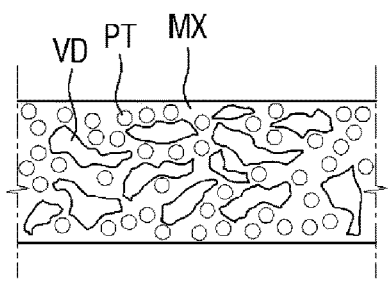
FIG. 4 and FIG. 5 are sectional views of a low refractive index pattern according to various exemplary embodiments.
Figure 5:
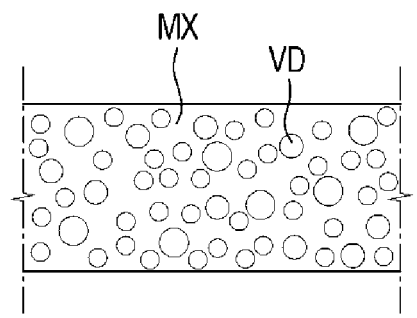

FIGS. 4 and 5 are sectional views of a low refractive index pattern according to various exemplary embodiments.

In an exemplary embodiment, the low refractive index pattern 20 may include a plurality of particles PT, a matrix MX formed as one body and configured to surround the particles PT, and a void VD, as shown in FIG. 4. Each of the particles PT may be a filler configured to adjust a refractive index and a mechanical intensity of the low refractive index pattern 20.

In the low refractive index pattern 20, the particles PT may be dispersed in the matrix MX, the matrix MX may be partially open, and the void VD may be formed at a corresponding portion. For example, the void VD may be formed in the matrix MX by mixing the plurality of particles PT and the matrix MX with a solvent, drying and/or curing the mixture, and vaporizing the solvent.

In another exemplary embodiment, the low refractive index pattern 20 may include the matrix MX and the void VD without particles, as shown in FIG. 5. For example, the low refractive index pattern 20 may include the matrix MX formed as one body, such as a foam resin, and a plurality of voids VDs disposed in the matrix MX.

As shown in FIGS. 4 and 5, when the low refractive index pattern 20 includes the void VD, the total refractive index of the low refractive index pattern 20 may range between a refractive index of the particle PT/matrix MX and a refractive index of the void VD. As described above, in the case in which the void VD is in vacuum having a refractive index of 1 or is filled with an air layer or gas having a refractive index of about 1, the total refractive index of the low refractive index pattern 20 may be less than or equal to 1.4, for example, 1.25, even when a material having a refractive index of 1.4 or more is used as the particle PT/the matrix MX. For example, the particle PT may be made of an inorganic material, such as SiO2, $Fe_2O_3$, and $MgF_2$, and the matrix MX may be made of an organic material, such as polysiloxane. Alternatively, other organic or inorganic materials may be used.

Referring back to FIGS. 1 to 3, the low refractive index pattern 20 may have a thickness ranging from 0.4 μm to 2 μm. When the thickness of the low refractive index pattern 20 is greater than or equal to 0.4 μm, which is in visible light wavelength range, an effective optical interface may be formed with the upper surface 10a of the light guide plate 10, and thus, total reflection is more likely to occur on the upper surface 10a of the light guide plate 10, according to Snell's law. The low refractive index pattern 20 that is too thick may be contrary to thinning the optical member 100, may increase material costs, and may be disadvantageous in terms of luminance of the optical member 100, and thus, the low refractive index pattern 20 may be formed to have a thickness of 2 μm or less. For example, the thickness of the low refractive index pattern 20 may be about 0.5 μm.

As described above, the ratio of the area occupied by the low refractive index pattern 20 to the upper surface 10a of the light guide plate 10 may change depending on the amount of light guided into the light guide plate 10.

For example, the low refractive index pattern 20 may adjust the ratio of the area occupied by the low refractive index pattern 20 per unit area by including through-holes H1 having different sizes and/or positions.

Figure 7:
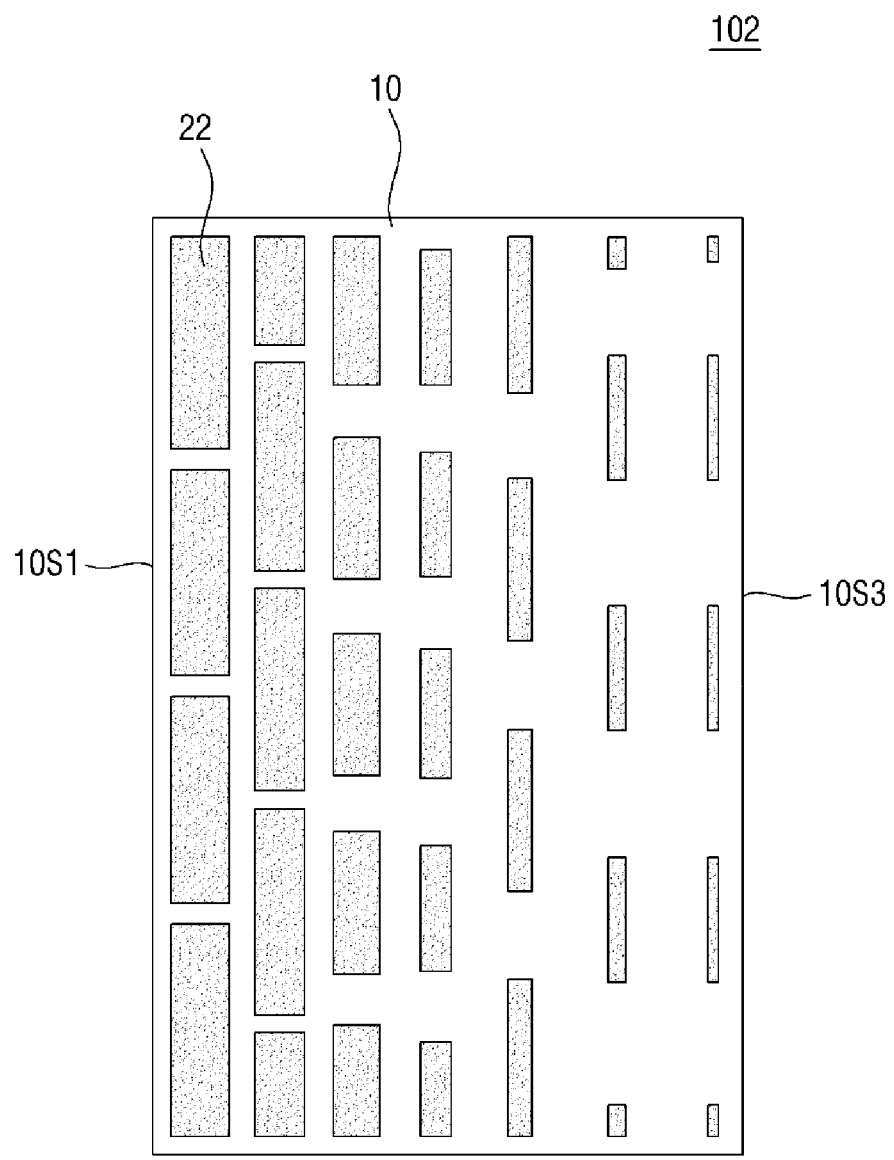
Figure 8:
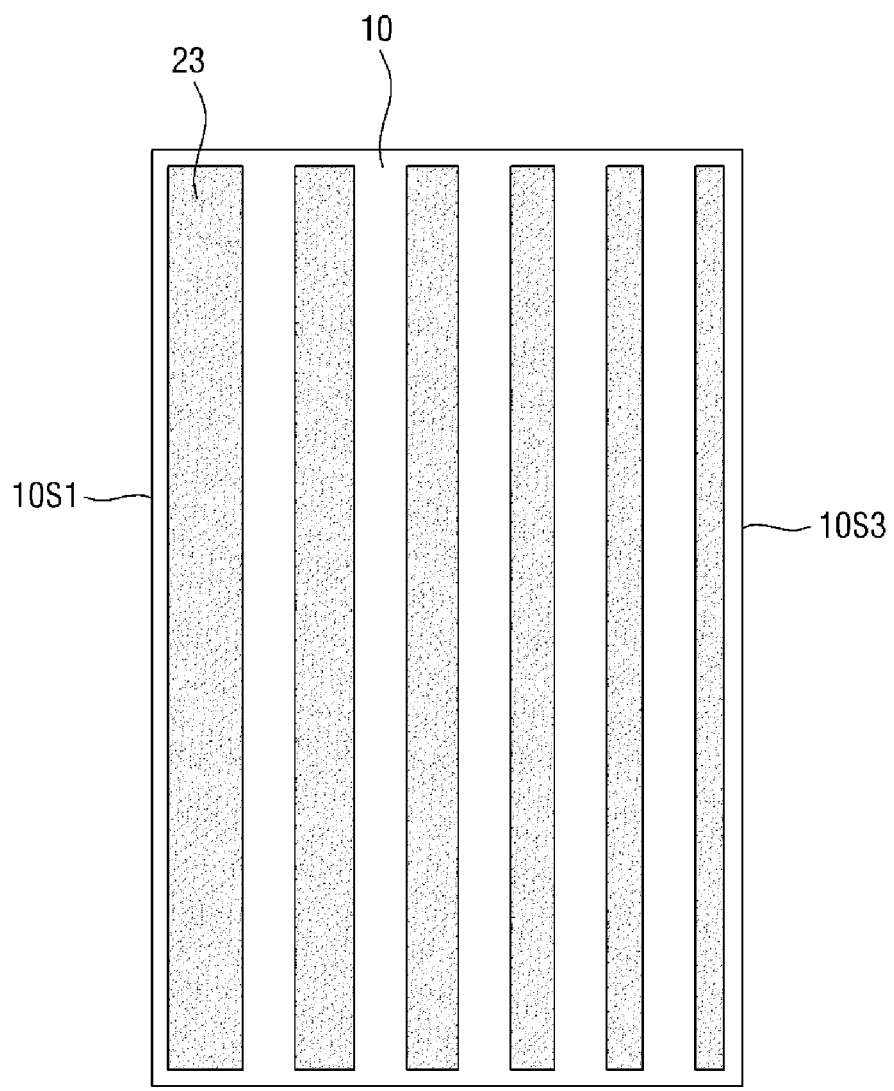
Figure 9:
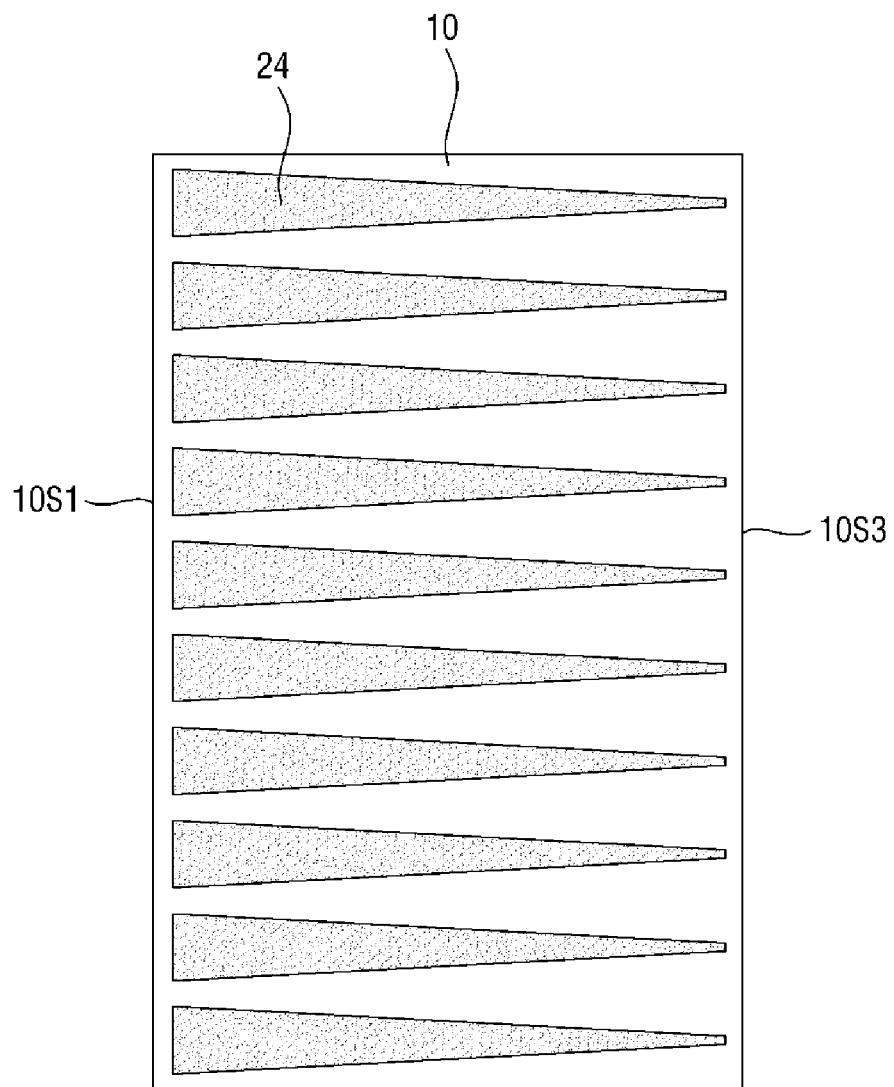

In another example, the low refractive index pattern 20 may include a plurality of low refractive index patterns 22, 23, and 24, as shown in FIGS. 7 to 9. Ratios of the areas occupied by the low refractive index patterns 22, 23, and 24 per unit area may be adjusted by changing sizes and/or positions of the low refractive index patterns 22, 23, and 24. The case in which the plurality of low refractive index patterns 22, 23, and 24 are disposed will be described with reference to FIGS. 7 to 9. The case in which the through-hole H1 is formed on the low refractive index pattern 20 will be described below.

The low refractive index pattern 20 may cover most of the upper surface 10a of the light guide plate 10 and may expose a portion of an edge of the light guide plate 10. In other words, the side surface 10S of the light guide plate 10 may protrude relative to a side surface 20s of the low refractive index pattern 20. The upper surface 10a exposed by the low refractive index pattern 20 provides a space in which the side surface 20s of the low refractive index pattern 20 may be stably covered by the passivation layer 40.

The through-hole H1 passes through the low refractive index pattern 20 from an upper surface 20a of the low refractive index pattern 20 to a lower surface 20b thereof, that is, in a third direction Z. The upper surface 10a of the light guide plate 10 is exposed in a region in which the through-hole H1 is disposed. The wavelength conversion layer 30 is disposed in the through-hole H1, and the upper surface 10a of the light guide plate 10 exposed by the through-hole H1 may be in direct contact with the wavelength conversion layer 30.

A planar shape of the through-hole H1 is not particularly limited and may be a circular shape, as shown in FIG. 2. In this specification, the planar shape of the through-hole H1 refers to a sectional shape of the through-hole H1 taken vertically in the third direction Z.

The planar area of the through-hole H1 may be substantially uniform along positions in the third direction Z. In this specification, the planar area of the through-hole H1 refers to an area of a figure having a shape corresponding to the planar shape of the through-hole H1. For example, when the planar shape of the through-hole H1 is circular, an inner wall of the through-hole H1 is substantially perpendicular to any one surface of the low refractive index pattern 20, and the through-hole H1 may have a cylindrical shape as a whole.

The through-holes H1 may be regularly arranged in the first direction X and the second direction Y. For example, the through-holes H1 may be arranged at regular intervals in the first direction X and the second direction Y. That is, the through-holes H1 may be substantially disposed in the shape of a matrix. As another example, the through-holes H1 may be arranged at regular intervals in the second direction Y, and a separation distance between the through-holes H1 may gradually decrease in the first direction X. In this case, in a sectional shape taken in the first direction X, a width of the low refractive index pattern 20 may gradually decrease. However, the separation distance between the through-holes H1 is not limited to the above example. Also, the through-holes H1 may be irregularly arranged in the first direction X and/or the second direction Y. Even in this case, the through-holes H1 are arranged in consideration of the ratio of the area occupied by the low refractive index pattern 20 per unit area.

A diameter d of the through-hole H1 may gradually increase in the first direction X. That is, the planar area of the through-hole H1 may gradually increase in the first direction X. Thus, an area occupied by the low refractive index pattern 20 in the upper surface 10a of the light guide plate 10 may gradually decrease in the first direction X. For example, when the separation distance between the through-holes H1 is uniform in the first direction X, the width of the low refractive index pattern 20 disposed between the through-holes H1 may be constant. Nevertheless, the diameter d of the through-hole H1 increases in the first direction X, and thus the separation distance in the low refractive index pattern 20 increases. Accordingly, a ratio of the area occupied by the low refractive index pattern 20 per unit area near the light incidence surface 10S1 may be higher than a ratio of the area occupied by the low refractive index pattern 20 per unit area near the opposite surface 10S3.

The wavelength conversion layer 30 is disposed in the through-hole H1, and the upper surface 10a of the light guide plate 10 exposed by the through-hole H1 may be in direct contact with the wavelength conversion layer 30. As an area of the through-hole H1 increases in the first direction X, the area of the upper surface 10a of the light guide plate 10 in direct contact with the wavelength conversion layer 30 may increase. An area occupied by the low refractive index pattern 20 in the upper surface 10a of the light guide plate 10 and an area occupied by the wavelength conversion layer 30 in the upper surface 10a of the light guide plate 10 may change in the first direction X. That is, an area of the low refractive index pattern 20 is increased to increase a total reflection ratio near the light incidence surface 10S1 at which the amount of guided light is sufficient, and an area of the wavelength conversion layer 30 is increased to increase the amount of emitted light near the opposite surface 10S3 at which the amount of guided light is lacking. As a result, the amount of light emitted toward the upper surface 10a of the light guide plate 10 near the light incidence surface 10S1 becomes similar to the amount of light emitted toward the upper surface 10a of the light guide plate 10 near the opposite surface 10S3, and thus, it is possible to improve luminance uniformity.

The wavelength conversion layer 30 is disposed on the upper surface 20a of the low refractive index pattern 20. A lower surface 30b of the wavelength conversion layer 30 may be in contact with the upper surface 20a of the low refractive index pattern 20 and the upper surface 10a of the light guide plate 10.

The wavelength conversion layer 30 converts the wavelength of at least some of incident light. The wavelength conversion layer 30 may include a binder layer and wavelength conversion particles dispersed in the binder layer. The wavelength conversion layer 30 may further include scattering particles dispersed in the binder layer in addition to the wavelength conversion particles.

The binder layer is a medium in which the wavelength conversion particles are dispersed, and may be formed of various resin compositions that can be generally referred to as binders. However, the inventive concepts are not limited thereto, and, in this specification, a medium in which the wavelength conversion particles and/or the scattering particles can be dispersed may be referred to as the "binder layer" regardless of its name, other additional functions, and elements.

The wavelength conversion particle is a particle that converts a wavelength of incident light and may be, for example, a quantum dot (QD), a fluorescent material, or a phosphorescent material. The QD, which is an example of the wavelength conversion particle, will be described in detail. The QD has a material with a crystalline structure which is several nanometers in size, is composed of hundreds to thousands of atoms, and shows a quantum confinement effect in which an energy band gap increases due to a small size of a material. When light with a wavelength having higher energy than a band gap is incident on the QD, the QD enters into an excited state by absorbing the light, and falls to a ground state while emitting specific wavelength light. The emitted specific wavelength light has a value corresponding to the band gap. It is possible to adjust light-emitting characteristics of the QD due to the quantum confinement effect by adjusting the size and composition of the QD.

For example, the QD may include at least one of group II-VI compounds, group II-V compounds, group III-VI compounds, group III-V compounds, group IV-VI compounds, group compounds, group II-IV-VI compounds, and group II-IV-V compounds.

The QD may include a core and a shell that coats the core. The core may be at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge, but is not limited thereto. The shell may be at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe, but is not limited thereto.

The wavelength conversion particle may include a plurality of wavelength conversion particles capable of converting incident light into light with different wavelengths. For example, the wavelength conversion particle may include a first wavelength conversion particle configured to convert a specific wavelength of the incident light into a first wavelength, and a second wavelength particle configured to convert a specific wavelength of the incident light into a second wavelength. For example, light emitted from the light source 400 toward the wavelength conversion particle may be light of a blue wavelength, the first wavelength may be a green wavelength, and the second wavelength may be a red wavelength. For example, the blue wavelength may be a wavelength having a peak between 420 nm and 470 nm, the green wavelength may be a wavelength having a peak between 520 nm and 570 nm, and the red wavelength may be a wavelength having a peak between 620 nm and 670 nm. However, the blue, green, and red wavelengths are not limited to the above example and should be understood to include all wavelength ranges recognizable in the related art as blue, green, and red.

In this example, while blue light incident on the wavelength conversion layer 30 passes through the wavelength conversion layer 30, a portion of the blue light may be incident on the first wavelength conversion particle, converted into green wavelength light, and emitted; another portion thereof may be incident on the second wavelength conversion particle, converted into red wavelength light, and emitted; and yet another portion thereof may be emitted without being incident on the first and second wavelength conversion particles. Accordingly, the light passing through the wavelength conversion layer 30 may include all of the blue wavelength light, the green wavelength light, and the red wavelength light. It is possible to display white light or other light by appropriately adjusting rates of light having different wavelengths. The light converted by the wavelength conversion layer 30 is concentrated within a specific narrow wavelength region and has a sharp spectrum having a narrow half width. Accordingly, it is possible to improve color representability by filtering light of the spectrum with a color filter to represent colors.

Unlike the above example, incident light may be short wavelength light such as ultraviolet rays, and three kinds of wavelength conversion particles for converting a short wavelength into the blue wavelength, the green wavelength, and the red wavelength may be disposed in the wavelength conversion layer 30 to emit white light.

The wavelength conversion layer 30 may further include a scattering particle. The scattering particle is a non-quantum particle which has no wavelength conversion function. The scattering particle scatters incident light so that more incident light may be incident on the particle conversion particle. Furthermore, the scattering particle may uniformly control an emission angle of light for each wavelength. In detail, the scattering particle has a scattering characteristic in which, when some incident light is incident on the wavelength conversion particle, converted in wavelength, and then emitted, an emission direction thereof is random. When no scattering particle is present in the wavelength conversion layer 30, the green wavelength and red wavelength emitted after the collision of incident light with the wavelength conversion particle have a scattering emission characteristic, but the blue wavelength emitted when no collision of the incident light occurs with the wavelength conversion particle does not have a scattering emission characteristic such that the amount of emitted blue/green/red wavelength light may change depending on the emission angle. The scattering particle assigns the scattering emission characteristic even to the blue wavelength being emitted without collision with the wavelength conversion particle, thus similarly adjusting the emission angle of light for each of the wavelengths. $TiO_2$, $SiO_2$, or the like may be used as the scattering particle.

A thickness of the wavelength conversion layer 30 may be greater than that of the low refractive index pattern 20. The wavelength conversion layer 30 may have a thickness ranging from about 10 μm to about 50 μm. For example, the thickness of the wavelength conversion layer 30 may be about 15 μm.

The wavelength conversion layer 30 may cover the upper surface 20a of the low refractive index pattern 20, fill a through-hole H, and fully overlap the low refractive index pattern 20. The lower surface 30b of the wavelength conversion layer 30 may be in direct contact with the upper surface 20a of the low refractive index pattern 20. Also, the wavelength conversion layer 30 may be in direct contact with the upper surface 10a of the light guide plate 10 in a region in which the through-hole H is formed. In the region in which the light guide plate 10 and the wavelength conversion layer 30 are in direct contact with each other, light may not be totally reflected but may be emitted toward the upper surface 10a of the light guide plate 10 to enter the wavelength conversion layer 30.

For example, a side surface 30s of the wavelength conversion layer 30 may be aligned with the side surface 20s of the low refractive index pattern 20. The side surface 30s of the wavelength conversion layer 30 may have a smaller inclination angle than the side surface 20s of the low refractive index pattern 20. As will be described below, when the wavelength conversion layer 30 is formed by a method such as slit coating, the side surface 30s of the wavelength conversion layer 30, which is relatively thick, may have a smaller inclination angle than the side surface 20s of the low refractive index pattern 20. However, the inventive concepts are not limited thereto, and the inclination angle of the side surface 30s of the wavelength conversion layer 30 may be substantially the same as or less than that of the side surface 20s of the low refractive index pattern 20.

The wavelength conversion layer 30 may be formed by a coating method. For example, the wavelength conversion layer 30 may be formed by slit-coating a wavelength conversion composition onto the low refractive index pattern 20 and then drying and curing the wavelength conversion composition. However, the inventive concepts are not limited thereto, and various stacking methods, such as spin coating, roll coating, spray coating, and inkjet coating, may be used.

The passivation layer 40 is disposed on the low refractive index pattern 20 and the wavelength conversion layer 30. The passivation layer 40 serves to prevent penetration of moisture and/or oxygen (hereinafter referred to as "moisture/oxygen"). The passivation layer 40 may include an inorganic material. For example, the passivation layer 40 may include silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metallic thin film having light transmittance. For example, the passivation layer 40 may include silicon nitride.

The passivation layer 40 may fully cover the low refractive index pattern 20 and the wavelength conversion layer 30 at at least one side surface. For example, the passivation layer 40 may fully cover the low refractive index pattern 20 and the wavelength conversion layer 30 at all side surfaces, but the inventive concepts are not limited thereto.

The passivation layer 40 fully overlaps the wavelength conversion layer 30 and covers an upper surface 30a of the wavelength conversion layer 30. Also, the passivation layer 40 extends outward to cover even the side surface 30s of the wavelength conversion layer 30 and the side surface 20s of the low refractive index pattern 20. The passivation layer 40 may be in contact with the upper surface 30a and the side surface 30s of the wavelength conversion layer 30 and the side surface 20s of the low refractive index pattern 20. The passivation layer 40 extends even to an edge of the upper surface 10a of the light guide plate 10 exposed by the low refractive index pattern 20 so that a portion of the edge of the passivation layer 40 may be in direct contact with the upper surface 10a of the light guide plate 10. In an exemplary embodiment, a side surface 40s of the passivation layer 40 may be aligned with the side surface 40s of the light guide plate 10. The side surface 40s of the passivation layer 40 has an inclination angle greater than that of the side surface 30s of the wavelength conversion layer 30. Furthermore, the side surface 40s of the passivation layer 40 may have an inclination angle greater than that of the side surface 20s of the low refractive index pattern 20.

A thickness of the passivation layer 40 may be less than that of the wavelength conversion layer 30 and may be equal to or less than that of the low refractive index pattern 20. The thickness of the passivation layer 40 may range from 0.1 μm to 2 μm. When the thickness of the passivation layer 40 is greater than or equal to 0.1 μm, the passivation layer 40 may exhibit a significant moisture/oxygen penetration prevention function. When the thickness of the passivation layer 40 is greater than or equal to 0.3 μm, the passivation layer 40 may have an effective moisture/oxygen penetration prevention function. When the thickness of the passivation layer 40 is less than or equal to 2 µm, there are advantages in terms of thinning and transmittance. For example, the thickness of the passivation layer 40 may be about 0.4 µm.

The wavelength conversion layer 30, in particular, the wavelength conversion particle included therein, is vulnerable to moisture/oxygen. A wavelength conversion film prevents penetration of moisture/oxygen into the wavelength conversion layer by stacking a barrier film on an upper and lower surface of the wavelength conversion layer. However, according to this exemplary embodiment, the wavelength conversion layer 30 is directly disposed without a barrier film, and thus, instead of the barrier film, there is a need for a sealing structure configured to protect the wavelength conversion layer 30. The sealing structure may be implemented by the passivation layer 40 and the light guide plate 10.

Gates through which moisture may penetrate into the wavelength conversion layer 30 are the upper surface 30a, the side surface 30s, and the lower surface 30b of the wavelength conversion layer 30. As described above, the upper surface 30a and the side surface 30s of the wavelength conversion layer 30 are protected by being covered with the passivation layer 40, and thus, it is possible to block or at least reduce (hereinafter referred to as block/reduce) penetration of moisture/oxygen.

The lower surface 30b of the wavelength conversion layer 30 is in contact with the upper surface 20a of the low refractive index pattern 20. In this case, when the low refractive index pattern 20 includes a void or is made of an organic material, moisture may move into the low refractive index pattern 20, and thus moisture/oxygen may penetrate through the lower surface 30b thereof. However, according to this exemplary embodiment, even the low refractive index pattern 20 may have a sealing structure, and thus it is possible to fundamentally block the penetration of moisture/oxygen through the lower surface 30b thereof.

In detail, the side surface 20s of the low refractive index pattern 20 is protected by being covered with the passivation layer 40, and thus, it is possible to block/reduce penetration of moisture/oxygen through the side surface 20s thereof. Even when the low refractive index pattern 20 protrudes farther than the wavelength conversion layer 30 such that a portion of the upper surface 20a is exposed, the exposed portion is protected by being covered with the passivation layer. Accordingly, even in this case, it is possible to block/reduce the penetration of moisture/oxygen. The lower surface 20b of the low refractive index pattern 20 is in contact with the light guide plate 10. When the light guide plate 10 is made of an inorganic material, such as glass, the light guide plate 10 can block/reduce the penetration of moisture/oxygen like the passivation layer 40. As a result, the surface of a stacked body of the low refractive index pattern 20 and the wavelength conversion layer 30 is surrounded and sealed by the passivation layer 40 and the light guide plate 10. Accordingly, although a moisture/oxygen moving path is provided inside the low refractive index pattern 20, it is possible to block/reduce the penetration of moisture/oxygen by the sealing structure, and thus, it is possible to prevent or at least alleviate deterioration of the wavelength conversion particle due to moisture/oxygen.

The passivation layer 40 may be formed by a method such as deposition. For example, the passivation layer 40 may be formed on the light guide plate 10 on which the low refractive index pattern 20 and the wavelength conversion layer 30 are sequentially formed by using a chemical vapor deposition method. However, the inventive concepts are not limited thereto, and a physical vapor deposition, a sputtering method, an atomic deposition, and other various stacking methods may be used.

As described above, the optical member 100 is a single integrated member and may perform both a light guide function and a wavelength conversion function. The single integrated member may simplify a process of assembling a display device. Also, it is possible to effectively achieve total reflection on the upper surface 10a of the light guide plate 10 by placing the low refractive index pattern 20 on the upper surface 10a of the light guide plate 10, and also it is possible to prevent deterioration of the wavelength conversion layer 30 by sealing the low refractive index pattern 20 and the wavelength conversion layer 30 with the passivation layer 40 or the like.

Also, the wavelength conversion layer 30 and the sealing structure of the optical member 100 can reduce a manufacturing cost thereof and decrease a thickness thereof in comparison to the case in which a wavelength conversion film is provided as a separate film. For example, the wavelength conversion film is obtained by attaching a barrier film to the upper and low portion of the wavelength conversion layer 30. However, the barrier film is expensive and also relatively thick (having a thickness greater than or equal to 100 µm) and the total thickness of the wavelength conversion film reaches about 270 µm. Meanwhile, according to this exemplary embodiment, the low refractive index pattern 20 may be formed to have a thickness of about 0.5 µm, and the passivation layer 40 may be formed to have a thickness of about 0.4 µm. Accordingly, the total thickness of the optical member 100, except for the light guide plate 10, may be maintained at about 16 µm, and thus, it is possible to decrease a thickness of a display device that employs the optical member 100. Also, the manufacturing cost of the optical member 100 may be controlled to be lower than that of the wavelength conversion film because an expensive barrier film can be omitted therefrom.

Other exemplary embodiments of the optical member will be described below. In the following exemplary embodiments, descriptions of the same configurations as those of the above-described exemplary embodiment will be omitted or simplified, and differences therebetween will be mainly described. The following drawings show arrangement/alignment relations at one side surface of the optical member. However, the same structure may be applied to a plurality of side surfaces or all side surfaces, and various side surface structures may be applied in combination. Each structure may be intentionally obtained and may also be unintentionally obtained during a manufacturing process.

FIGS. 6 to 9 are plan views showing a light guide plate on which a low refractive index pattern is disposed according to various exemplary embodiments. The exemplary embodiments of FIGS. 6 to 9 show that the light guide plate may be formed in various shapes to change an area at which the low refractive index pattern is disposed.

Figure 6:
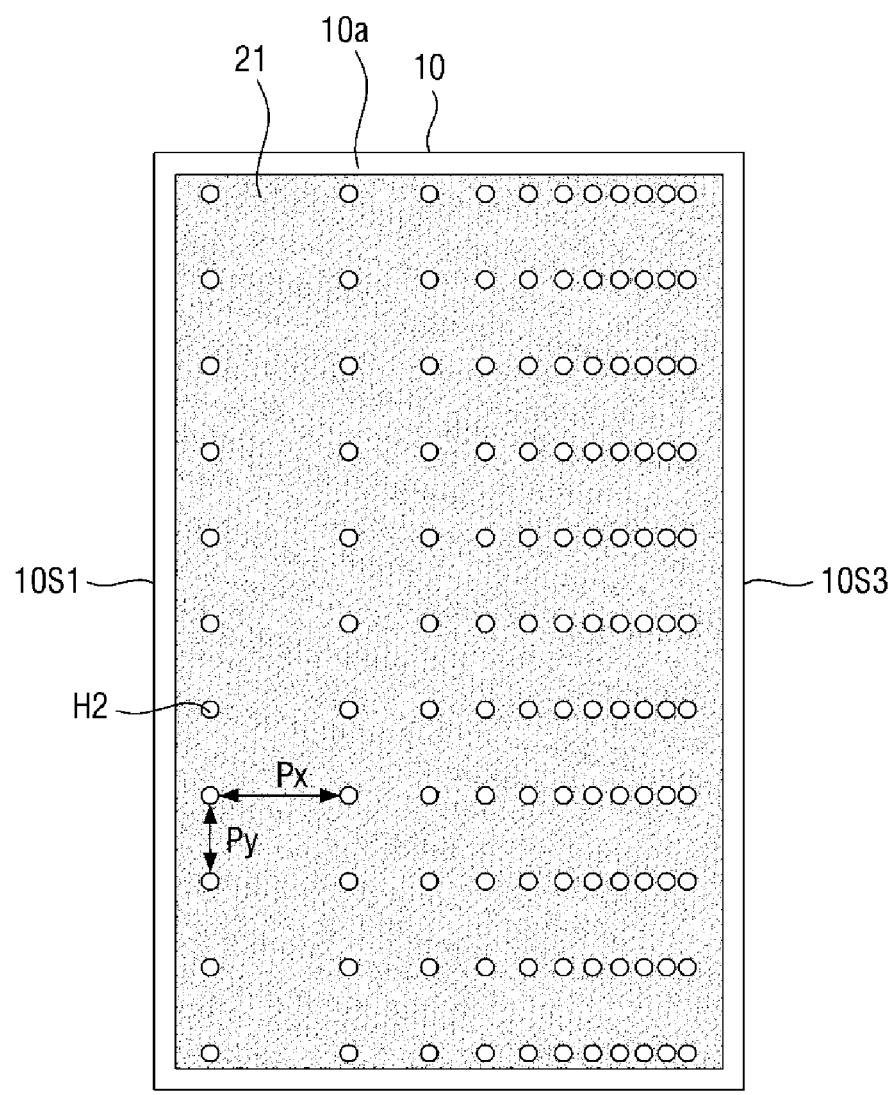
FIG. 6, FIG. 7, FIG. 8 and FIG. 9 are plan views showing a light guide plate on which a low refractive index pattern is disposed according to various exemplary embodiments.

FIG. 6 shows that through-holes H2 formed on a low refractive index pattern 21 of an optical member 101 may have a constant size. That is, unlike the exemplary embodiment of FIG. 2, it is possible to adjust an arrangement density per unit area of the low refractive index pattern 21 by changing an arrangement density of the through-holes H2 when the through-holes H2 of the low refractive index pattern 21 have a constant diameter d. In detail, the number of through-holes H2 may gradually increase from the light incidence surface 10S1 of the light guide plate 10 to the opposite surface 10S3. The through-holes H2 may be regularly arranged in the first direction X and the second direction Y. However, the inventive concepts are not limited thereto, and the through-holes H2 may be irregularly arranged. Even in this case, the arrangement density increases toward the opposite surface 10S3.

Separation distances Py between the through-holes H2 in the second direction Y may be uniform over the entirety of the light guide plate 10. That is, the through-holes H2 may be sequentially aligned in the first direction X. On the other hand, the through-holes H2 may have a first direction pitch Px gradually decreasing in the first direction X. The number of through-holes H2 per unit area near the light incidence surface 10S1 may be smaller than the number of through-holes H2 per unit area near the opposite surface 10S3.

As described above, the wavelength conversion layer 30 may be disposed in the through-holes H2. An area of the wavelength conversion layer 30 in contact with the light guide plate 10 may change depending on the arrangement density of the through-holes H2. That is, a ratio of an area occupied by the wavelength conversion layer 30 to an area occupied by the low refractive index pattern 20 near the light incidence surface 10S1 may be greater than an area ratio near the opposite surface 10S3. As a result, the amount of light emitted toward the upper surface 10a of the light guide plate 10 near the light incidence surface 10S1 may be similar to the amount of light in the opposite surface 10S3, and thus, it is possible to improve luminance uniformity.

Referring to FIG. 7, a low refractive index pattern 22 of an optical member 102 may include a plurality of patterns. That is, since the low refractive index pattern 22 is composed of a plurality of patterns, it is possible to adjust an area ratio of the low refractive index pattern 22 per unit area depending on a location thereof. The low refractive index patterns 20 and 21 of the optical members 100 and 101 shown in FIGS. 2 and 6 are different from that of the optical member 102 shown in FIG. 7 in that area ratios of the low refractive index patterns 20 and 21 per unit area are adjusted by sizes and/or arrangements of the through-holes H1 and H2.

The plurality of patterns of the low refractive index pattern 22 may be arranged in the first direction X and the second direction Y. The upper surface 10a of the light guide plate 10, at which the low refractive index pattern 22 is not disposed, is exposed to the wavelength conversion layer 30 so that the upper surface 10a may be in direct contact with the wavelength conversion layer 30. That is, the region in which the low refractive index pattern 22 is not disposed may correspond to regions at which the through-holes H1 and H2 are arranged in the low refractive index patterns 20 and 21.

A planar shape of the low refractive index pattern 22 is not particularly limited and may have a quadrangular shape. A planar area of the low refractive index pattern 22 may have the same size in the second direction Y. Conversely, the planar area of the low refractive index pattern 22 may gradually decrease in the first direction X. As the area of the low refractive index pattern 22 decreases, the exposed area of the upper surface 10a of the light guide plate 10 increases. That is, an area occupied by the low refractive index pattern 22 in the upper surface 10a of the light guide plate 10 may gradually decrease in the first direction in inverse proportion with the area occupied by the wavelength conversion layer 30. Thus, near the opposite surface 10S3 in which the amount of guided light is small in comparison to the light incidence surface 10S1, a ratio of the upper surface 10a of the light guide plate 10 in contact with the wavelength conversion layer 30 is relatively high. As a result, even in this case, it is possible to improve luminance uniformity.

Referring to FIG. 8, a low refractive index pattern 23 of an optical member 103 may include a plurality of patterns similar to the low refractive index pattern 22 of FIG. 7. However, the low refractive index pattern 23 of FIG. 8 is different from the low refractive index pattern 22 of FIG. 7, in which the plurality of patterns are irregularly arranged in the second direction Y, in that the low refractive index pattern 23 has a quadrangular prism shape continuously extending in the second direction Y.

The plurality of patterns of the low refractive index pattern 23 may be discontinuously arranged in the first direction X while continuously extending in the second direction Y. For example, a long side of the low refractive index pattern 23 may be disposed in the second direction Y and a short side of the low refractive index pattern 23 may be disposed in the first direction X. A length of the long side of the low refractive index pattern 23 may be constant in the first direction X, and a length of the short side of the low refractive index pattern 23 may gradually decrease in the first direction X. That is, a planar area of the low refractive index pattern 23 may gradually decrease from the light incidence surface 10S1 to the opposite surface 10S3 in the first direction X. Thus, the exposed area of the upper surface 10a of the light guide plate 10 increases in the first direction X, and an area of the upper surface 10a of the light guide plate 10 in contact with the wavelength conversion layer 30 increases. As a result, the amount of light emitted through the upper surface 10a of the light guide plate 10 near the opposite surface 10S3 increases, and thus it is possible to improve luminance uniformity.

Referring to FIG. 9, a low refractive index pattern 24 of an optical member 104 may have a linear shape continuously extending in the first direction X. The low refractive index pattern 23 of FIG. 8 is different from the low refractive index pattern 24 of FIG. 9 in that the low refractive index pattern 23 has a linear shape continuous extending in the second direction Y.

A plurality of patterns of the low refractive index pattern 24 may continuously extend in the first direction X and may be arranged in the second direction Y. In an exemplary embodiment, a planar shape of the low refractive index pattern 24 may have a triangular shape in which a base side thereof is disposed adjacent to the light incidence surface 10S1. In another exemplary embodiment, the planar shape of the low refractive index pattern 24 may have a trapezoidal shape in which a long side thereof is disposed adjacent to the light incidence surface 10S1 and a short side thereof is disposed adjacent to the opposite surface 10S3. However, the shape of the low refractive index pattern 24 is not limited to the above examples.

The low refractive index pattern 24 may have a width decreasing in the first direction X. That is, a planar area of the low refractive index pattern 24 may decrease from the light incidence surface 10S1 to the opposite surface 10S3. Since the upper surface 10a of the light guide plate 10 is exposed to the wavelength conversion layer 30 at a part at which the low refractive index pattern 24 is not disposed, a region in which the upper surface 10a of the light guide plate 10 is exposed may gradually increase in the first direction X. Accordingly, the amount of light emitted through the upper surface 10a of the light guide plate 10 increases from the light incidence surface 10S1 to the opposite surface 10S3, and thus, it is possible to improve luminance uniformity.

As described above, the low refractive index patterns 20 and 21 may be formed so that an arrangement area decreases from the light incidence surface 10S1 to the opposite surface 10S3 by forming the through-holes H1 and H2 or arranging a plurality of patterns having different arrangement densities as the low refractive index patterns 22, 23, and 24. Thus, near the opposite surface 10S3 of the light guide plate 10, the amount of light emitted toward the upper surface 10a of the light guide plate 10 may be greater than the amount of totally reflected light. However, the shapes and arrangement of the low refractive index patterns 21, 22, 23, and 24 are not limited to the above examples, and it is possible to adjust the arrangement areas of the refractive patterns by various methods. The low refractive index patterns 20 to 24 may be formed through a dry etching process, a printing method, or the like. This will be described in detail below with reference to FIGS. 10 to 13.

Figure 10:
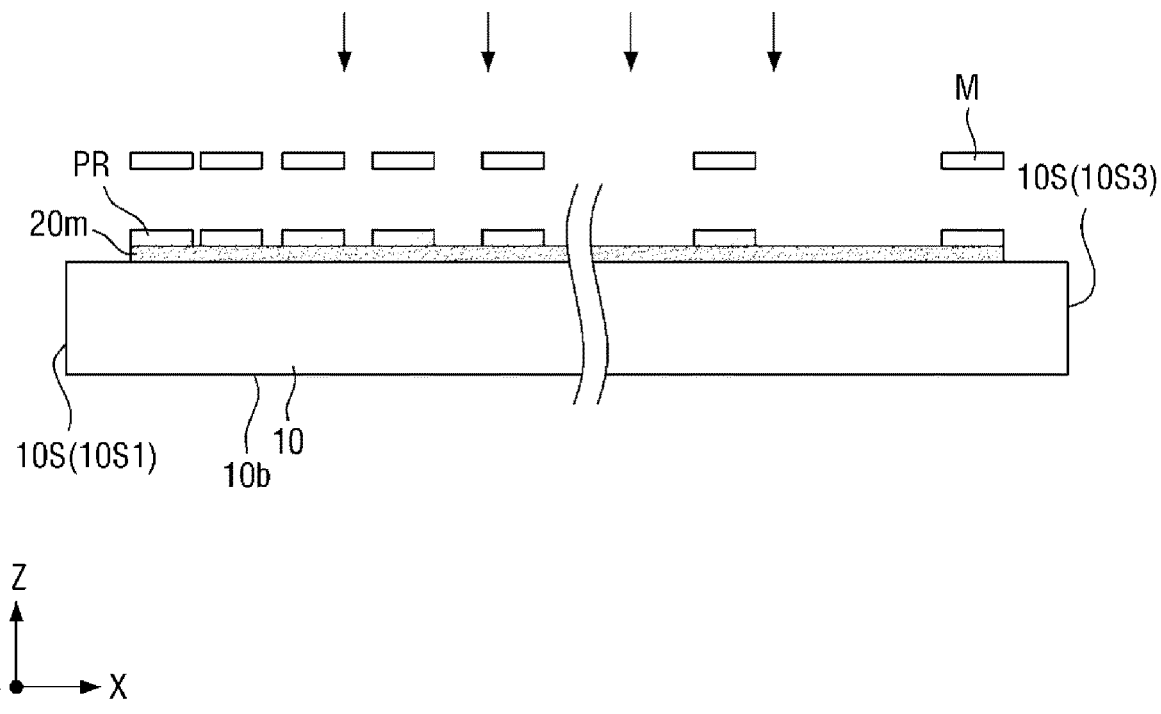
FIG. 10, FIG. 11, and FIG. 12 are sectional views schematically showing a method of manufacturing a low refractive index pattern according to an exemplary embodiment.
Figure 11:
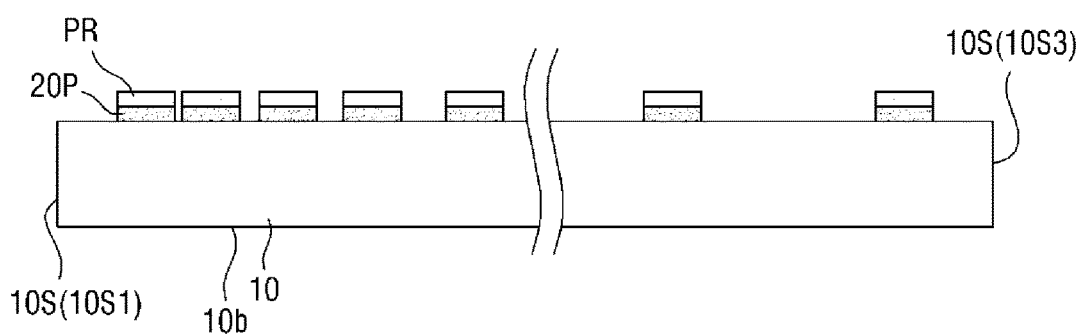
Figure 12:
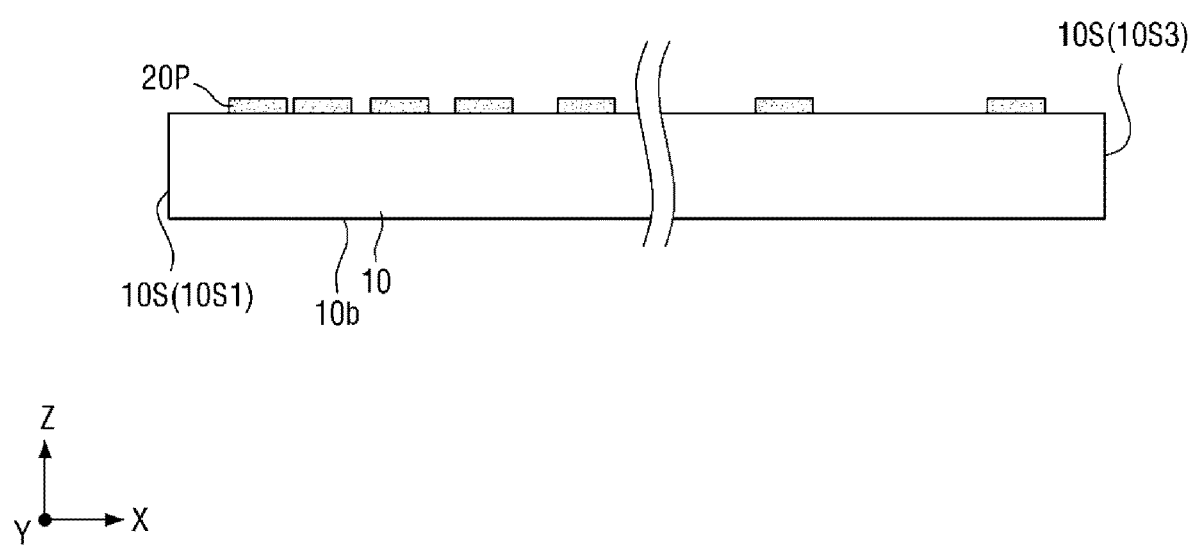
Figure 13:
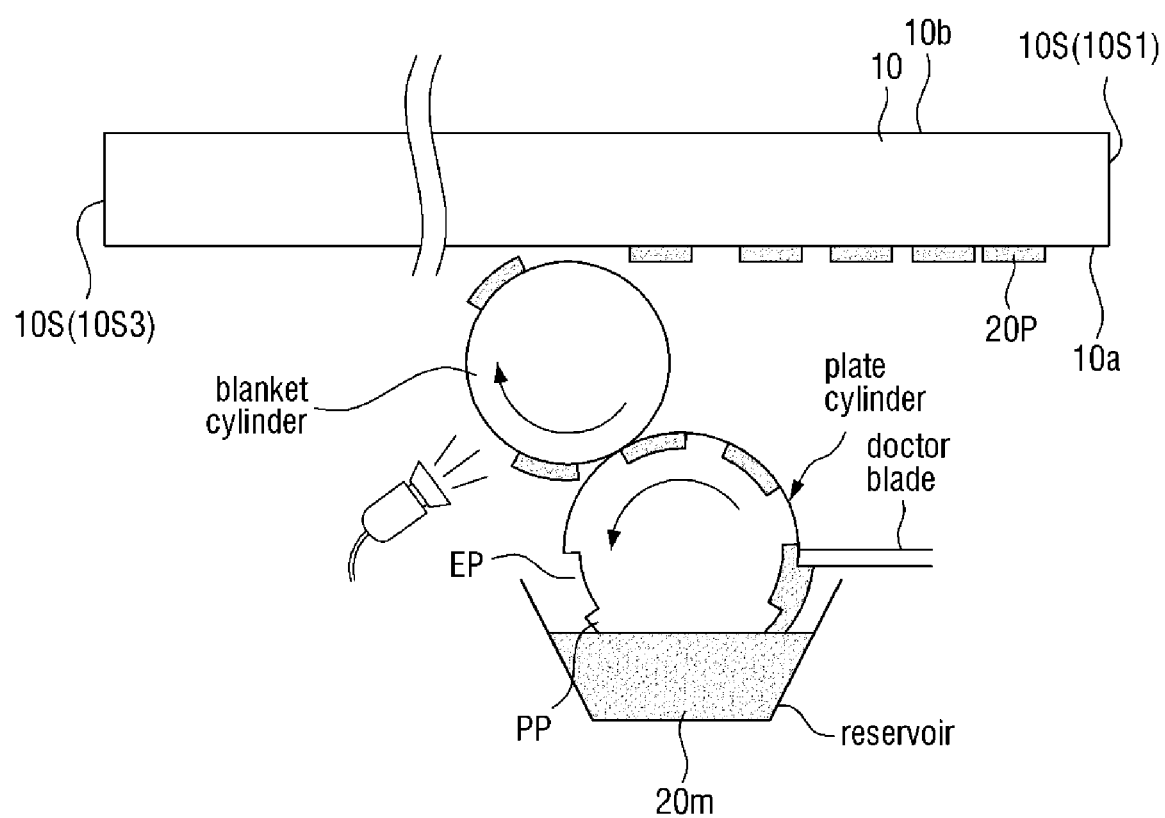
FIG. 13 is a sectional view schematically showing a method of manufacturing a low refractive index pattern according to another exemplary embodiment.

FIGS. 10 to 12 are sectional views schematically showing a method of manufacturing a low refractive index pattern according to an exemplary embodiment. FIG. 13 is a sectional view schematically showing a method of manufacturing a low refractive index pattern according to another exemplary embodiment.

Referring to FIG. 10, a low refractive index layer 20m is formed on the light guide plate 10. The low refractive index layer 20m may be formed by a coating method. For example, the low refractive index layer 20m may be formed by coating the upper surface 10a of the light guide plate 10 with a composition for the low refractive index pattern 20 and drying and curing the low refractive index layer composition. A method of coating with the composition for the low refractive index pattern 20 may include slit coating, spin coating, roll coating, spray coating, and inkjet coating, but is not limited thereto. Other various stacking methods may be used.

Subsequently, a photoresist film (not shown) is stacked on the entirety of an upper surface of the low refractive index layer 20m, and a mask M is disposed on the photoresist film. The photoresist film is exposed to light and developed using a developing solution to form a photoresist pattern PR.

Subsequently, as shown in FIG. 11, the low refractive index layer 20m is patterned using the photoresist pattern PR as a mask to form a low refractive index layer 20P having patterns. For example, a dry etching process may be used as a method of forming patterns in the low refractive index layer 20m, but is not limited thereto.

A shape of the low refractive index layer 20P including the patterns may change depending on a shape of the photoresist pattern PR. In an exemplary embodiment, the low refractive index layer 20P may include patterns for the through-holes H1 and H2 shown in FIGS. 2 and 6. In this case, the photoresist pattern PR is disposed in a remaining region other than regions corresponding to the through-holes H1 and H2. That is, the photoresist pattern PR may have a shape substantially covering one surface of the low refractive index layer 20m and having some exposed regions. The exposed regions of the photoresist pattern PR may be regions that become the through-holes H1 and H2.

In another exemplary embodiment, the low refractive index layer 20P may be patterned in the shape of the plurality of low refractive index patterns 22, 23, and 24 shown in FIGS. 7 to 9. In this case, the photoresist pattern PR may be formed only in some regions rather than substantially covering one surface of the low refractive index layer 20m. The regions in which the photoresist pattern PR is formed may be regions that become the low refractive index patterns 22, 23, and 24, and a region in which the photoresist pattern PR is not formed may correspond to a separation space between the low refractive index patterns 22, 23, and 24.

Subsequently, referring to FIG. 12, the photoresist pattern PR is removed to complete the low refractive index patterns 20 to 24. The low refractive index patterns 20 to 24 include a pattern corresponding to an opening formed with the mask M.

Referring to FIG. 13, the low refractive index pattern 20 may be formed through a printing method. For example, the low refractive index pattern 20 may be formed using a micro-gravure printing method, but is not limited thereto.

A micro-gravure printing apparatus may include a reservoir, a doctor blade, a plate cylinder, and a blanket cylinder. Each of the plate cylinder and the blanket cylinder have a cylinder shape which has a similar length to the width of the light guide plate.

First, a plate cylinder including uneven patterns PP and EP is disposed such that the plate cylinder is partially immersed in a reservoir storing the composition for the low refractive index pattern 20. The uneven pattern may include an engraved pattern EP and a protruding pattern PP that relatively protrudes. The engraved pattern EP provides a space filled with the composition for the low refractive index pattern 20, which becomes the low refractive index pattern 20. The engraved pattern EP has a shape corresponding to the low refractive index pattern 20.

The engraved pattern is filled with the composition for the low refractive index pattern 20 when the plate cylinder rotates in a counter-clockwise direction. The doctor blade is disposed adjacent to the plate cylinder and configured to remove the remaining composition for the low refractive index pattern 20 present in the plate cylinder so that only the engraved pattern may be filled with the composition for the low refractive index pattern.

In an exemplary embodiment, the protruding pattern PP may have a shape corresponding to the through-holes H1 and H2, and the engraved pattern EP may have a shape corresponding to the low refractive index patterns 20 and 21. In this case, the low refractive index patterns 20 and 21 including the through-holes H1 and H2 of FIGS. 2 and 6 may be formed in the light guide plate 10.

In another exemplary embodiment, the engraved pattern EP may have a shape corresponding to the low refractive index patterns 22, 23, and 24, and the protruding pattern PP may have a shape corresponding to a separation space between the low refractive index patterns 22, 23, and 24. In this case, the low refractive index patterns 22, 23, and 24 of FIGS. 7 to 9 may be formed on the light guide plate 10.

A circumference of the plate cylinder may be substantially the same as a width from the light incidence surface 10S1 of the light guide plate 10 to the opposite surface 10S2, and the uneven patterns PP and EP of the doctor blade may be previously disposed to correspond to the entire shape of the low refractive index patterns 20 to 24. In this case, the low refractive index patterns 20 to 24 may be formed by only one rotation of the doctor blade.

The blanket cylinder disposed in contact with the plate cylinder rotates in a direction opposite that of the plate cylinder, for example, in a clockwise direction. The composition for the low refractive index pattern 20 with which the engraved pattern of the plate cylinder is filled is transferred to the blanket cylinder. A composition pattern for the low refractive index pattern 20 transferred to the blanket cylinder may be pre-cured by UV emission.

The composition for the low refractive index pattern 20 transferred to the blanket cylinder is transferred toward the light guide plate 10. The composition for the low refractive index pattern 20 transferred to the light guide plate 10 may be post-cured by heat application to complete the low refractive index patterns 20 to 24.

FIGS. 14 to 17 are sectional views of optical members according to still other exemplary embodiments. The exemplary embodiments of FIGS. 14 to 17 show that arrangement and alignment relationships of elements of the optical member may be modified in various ways.

Figure 14:
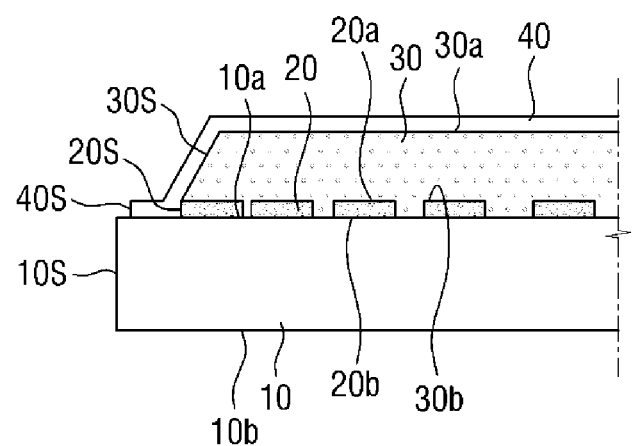
FIG. 14, FIG. 15, FIG. 16, and FIG. 17 are sectional views of optical members according to still other exemplary embodiments.

In an optical member 105 of FIG. 14, the passivation layer 40 may not fully cover the upper surface 10*a* of the light guide plate 10 exposed by the low refractive index pattern 20. That is, unlike the exemplary embodiment of FIG. 3, the side surface 40*s* of the passivation layer 40 may be recessed relative to the side surface 10S of the light guide plate 10 instead of being aligned with the side surface 10S of the light guide plate 10. Such a structure may be formed when a deposition process is performed with a certain margin from the side surface 10S of the light guide plate 10 to prevent a passivation material from being deposited on the side surface 10S of the light guide plate 10 when the passivation layer 40 is formed. Even in this case, a sealing structure may be maintained as long as the passivation layer 40 covers both the wavelength conversion layer 30 and the low refractive index pattern 20.

Figure 15:
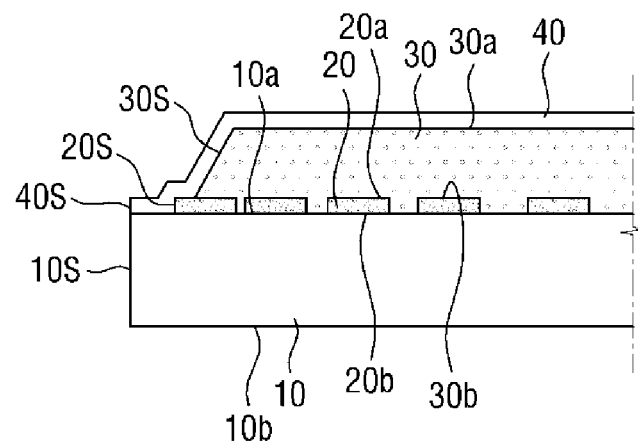
Figure 16:
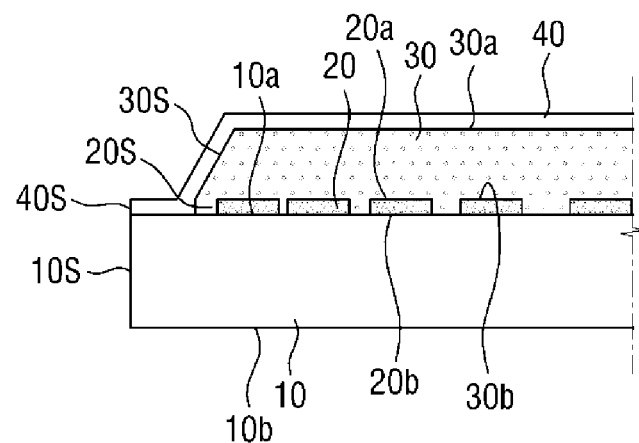

FIGS. 15 and 16 show that side surfaces 20*s* of low refractive index patterns 20 of optical members 106 and 107 may not be aligned with side surfaces 30*s* of wavelength conversion layers 30.

For example, as shown in FIG. 15, the side surface 30*s* of the wavelength conversion layer 30 of the optical member 106 may be recessed relative to the side surface 20*s* of the low refractive index pattern 20. That is, the side surface 20*s* of the low refractive index pattern 20 protrudes toward the outside relative to the side surface 30*s* of the wavelength conversion layer 30. Such a structure may be obtained when the wavelength conversion layer 30 is formed with a certain margin from the side surface 10S of the low refractive index pattern 20 so that the wavelength conversion layer 30 may be stably disposed on the low refractive index pattern 20, which increases total reflection efficiency. Even in this case, a sealing structure may be maintained because the passivation layer 40 covers both the wavelength conversion layer 30 and the low refractive index pattern 20.

In another example, as shown in FIG. 16, the side surface 30*s* of the wavelength conversion layer 30 of the optical member 107 may protrude toward the outside relative to the side surface 20*s* of the low refractive index pattern 20. The protruding wavelength conversion layer 30 may cover the side surface 20*s* of the low refractive index pattern 20, and a portion of the wavelength conversion layer 30 may be in direct contact with the upper surface 10*a* of the light guide plate 10. Even in this case, a sealing structure may be maintained because the passivation layer 40 covers the side surface 30*s* of the wavelength conversion layer 30, and the lower surface 30*b* of the protruding wavelength conversion layer 30 is protected by the light guide plate 10.

Figure 17:
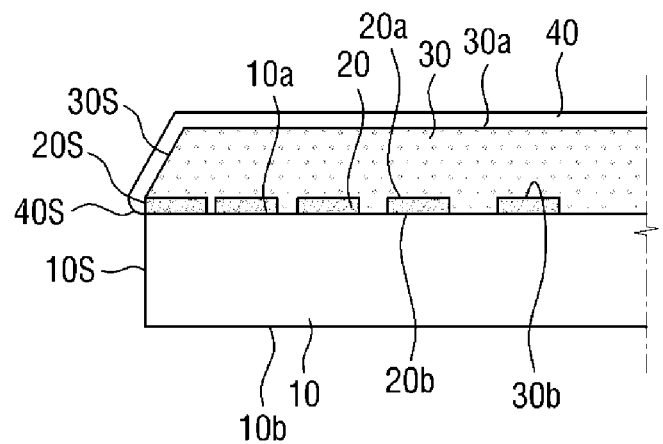

FIG. 17 shows that the side surface 40*s* of the passivation layer 40 of an optical member 108 may protrude toward the outside relative to the side surface 10S of the light guide plate 10. For example, as shown in FIG. 17, the side surface 20*s* of the low refractive index pattern 20 may be aligned with the side surface 10S of the light guide plate 10, and the passivation layer 40 may extend toward the outside relative to the side surface 20*s* of the low refractive index pattern 20 to cover the side surface 20*s* of the low refractive index pattern 20. In an exemplary embodiment, the passivation layer 40 may even cover the side surface 10S of the light guide plate 10. Even in this case, a sealing structure may be maintained as long as the passivation layer 40 covers both the wavelength conversion layer 30 and the low refractive index pattern 20. The exemplary embodiment of FIG. 17 may be advantageous in that an effective light guide area of the light guide plate 10 is maximized. Although not shown, even when the low refractive index pattern 20 is recessed relative to the side surface 10S of the light guide plate 10 as in the exemplary embodiment of FIG. 3, the passivation layer 40 may protrude toward the outside relative to the side surface 10S of the light guide plate 10.

Figure 18:
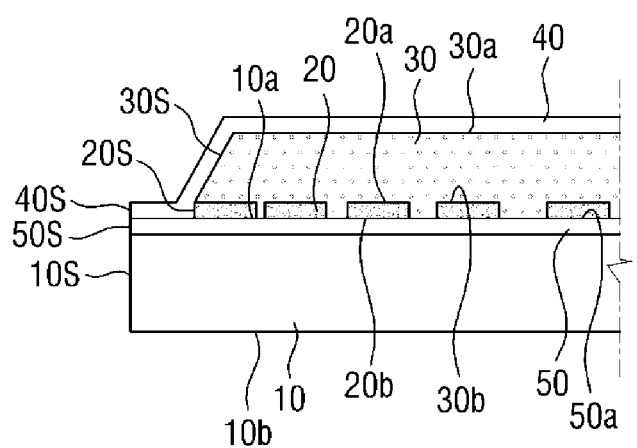
FIG. 18 is a sectional view of an optical member according to still another exemplary embodiment.

FIG. 18 is a sectional view of an optical member according to still another exemplary embodiment.

An optical member 109 according to this exemplary embodiment is different from that of the exemplary embodiment of FIG. 2 in that the optical member 109 further includes a barrier layer 50 disposed on the upper surface 10*a* of the light guide plate 10. In terms of arrangement of elements, the upper surface 10*a* of the light guide plate 10 of FIG. 2 may be replaced with an upper surface 50*a* of the barrier layer 50 in this exemplary embodiment.

More specifically with reference to FIG. 18, the barrier layer 50 is disposed on the upper surface 10*a* of the light guide plate 10, and the low refractive index pattern 20, the wavelength conversion layer 30, and the passivation layer 40 are sequentially stacked thereon. The barrier layer 50 may fully cover the upper surface 10*a* of the light guide plate 10. The side surface 50*s* of the barrier layer 50 may be aligned with the side surface 10S of the light guide plate 10.

The low refractive index pattern 20 is formed to be in contact with the upper surface 50*a* of the barrier layer 50. The low refractive index pattern 20 includes the through-hole H1 to partially expose the upper surface 50*a* of the barrier layer 50. The exposed upper surface 50*a* of the barrier layer 50 is in contact with the wavelength conversion layer 30. That is, the lower surface 30*b* of the wavelength conversion layer 30 may be in direct contact with the low refractive index pattern 20 and the barrier layer 50.

The low refractive index pattern 20 may partially expose an edge portion of the barrier layer 50. The wavelength conversion layer 30 is disposed on the low refractive index pattern 20, and the passivation layer 40 fully covers the low refractive index pattern 20 and the wavelength conversion layer 30. The passivation layer 40 fully overlaps the wavelength conversion layer 30 and extends outward to cover the side surface 30*s* of the wavelength conversion layer 30 and the side surface 20*s* of the low refractive index pattern 20. The passivation layer 40 even extends to an edge of the upper surface 50*a* of the barrier layer 50 exposed by the low refractive index pattern 20 so that a portion of the edge of the passivation layer 40 may be in direct contact with the upper surface 50*a* of the barrier layer 50.

Similar to the passivation layer 40, the barrier layer 50 serves to prevent penetration of moisture and/or oxygen (hereinafter referred to as "moisture/oxygen"). The barrier layer 50 may include an inorganic material. For example, the barrier layer 50 may include silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, or a metallic thin film having light transmittance. The barrier layer 50 may be made of the same material as that of the passivation layer 40, but is not limited thereto. The barrier layer 50 may be formed by a deposition method such as a chemical vapor deposition method.

The barrier layer 50 may have a thickness similar to that of the passivation layer 40. For example, the thickness of the barrier layer 50 may range from 0.1 μm to 2 μm.

The barrier layer 50 may have substantially the same refractive index as the light guide plate 10 to perform a smooth light guiding function of the optical member 109. Alternatively, the barrier layer 50 may have a different refractive index from the light guide plate 10.

For example, when the refractive index of the barrier layer 50 is the same as that of the light guide plate 10, a boundary between the light guide plate 10 and the barrier layer 50 may not be recognized as an interface. Thus, a propagation direction of light entering the boundary does not change. Accordingly, the light guide plate 10 and the barrier layer 50 may perform substantially the same light guiding function as the light guide plate 10 of FIG. 2.

When the refractive index of the barrier layer 50 is greater than that of the light guide plate 10, an emission angle decreases at the interface while a refractive index difference between the barrier layer 50 and the light guide plate 10 increases. Thus, total reflection may effectively occur at the interface between the barrier layer 50 and the low refractive index pattern 20.

When the refractive index of the barrier layer 50 is lower than the refractive index of the light guide plate 10, an emission angle increases while some light is totally reflected at a corresponding interface, and thus, it is possible to maintain maximum reflection efficiency.

As another way to maintain light guide characteristics similar to those in the exemplary embodiment of FIG. 2, the thickness of the barrier layer 50 may be formed to be smaller than visible light wavelengths. For example, when the thickness of the barrier layer 50 is less than or equal to 0.4 μm, for example, is set in the range of 0.1 μm to 0.4 μm, an effective optical interface is not formed between the light guide plate 10 and the barrier layer 50 and between the barrier layer 50 and the low refractive index pattern 20, and thus, the same light guide characteristics as shown in FIG. 2 may be exhibited regardless of the refractive index of the barrier layer 50. Even in consideration of the moisture/oxygen penetration prevention performance, the thickness of the barrier layer 50 may be described in the range of 0.3 μm to 0.4 μm.

As described above, according to this exemplary embodiment, a sealing structure of the wavelength conversion layer 30 may be implemented by the passivation layer 40 and the barrier layer 50. Accordingly, even when the moisture/oxygen penetration prevention function of the light guide plate 10 is insufficient, it is possible for the barrier layer 50 to effectively prevent the penetration of moisture/oxygen. In this regard, the degree of freedom in which the elements of the light guide plate 10 can be selected may increase. For example, even when a polymer resin, such as a polymethylmethacrylate (PMMA) resin, a polycarbonate (PC) resin, and an acrylic resin, is used as the light guide plate 10 instead of an inorganic material such as glass, it is possible to prevent the penetration of moisture/oxygen due to the barrier layer 50 such that deterioration of the wavelength conversion layer 30 is prevented.

Figure 19:
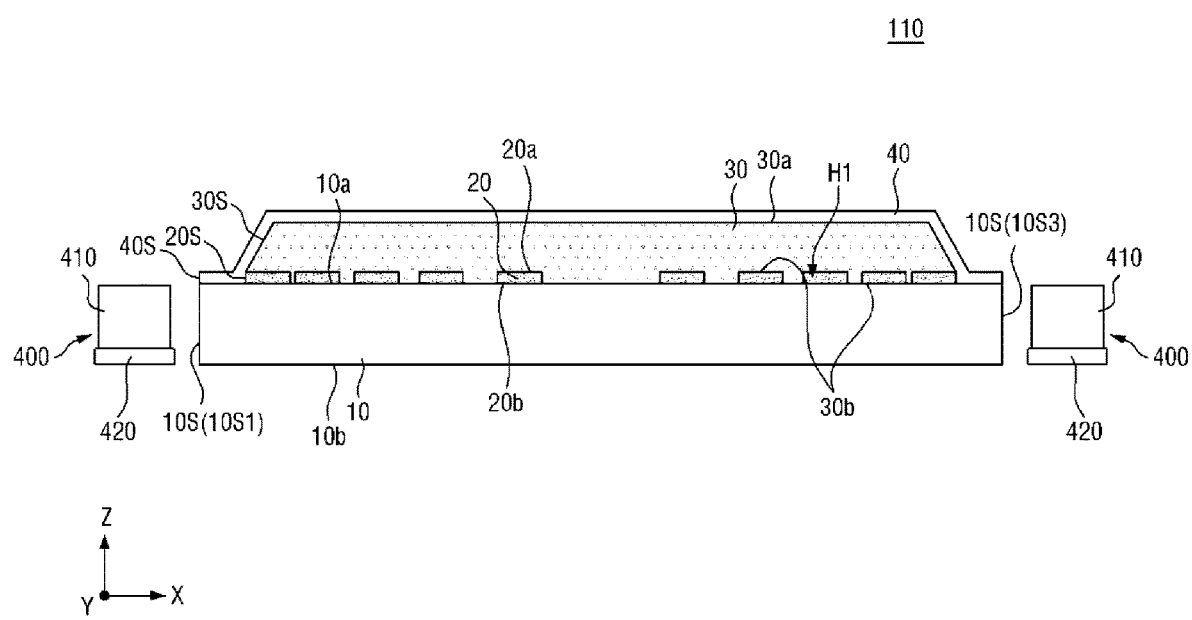
FIG. 19 is a sectional view of an optical member according to still another exemplary embodiment.

FIG. 19 is a sectional view of an optical member according to still another exemplary embodiment.

An optical member 110 of FIG. 19 is illustrated as being disposed adjacent to the side surfaces 10S1 and 10S3 of both long sides of the light guide plate 10. In this case, both of the side surfaces 10S1 and 10S3 of the light guide plate 10 are light incidence surfaces.

Both of the side surfaces 10S1 and 10S3 of the light guide plate 10 are adjacent to the light source 400 such that the amount of guided light is sufficient and the amount of guided light is relatively insufficient in the central portion of the light guide plate 10. The low refractive index pattern 20 may be disposed such that an area occupied by the low refractive index pattern 20 per unit area gradually decreases toward the central portion of the light guide plate 10. A planar area of the through-holes H1 may increase toward the central portion of the light guide plate 10. In other words, a ratio of the area occupied by the low refractive index pattern 20 to an area occupied by the wavelength conversion layer 30 in the upper surface 10a of the light guide plate 10 may be smaller in the central portion than in both of the side surfaces 10S1 and 10S3 of the light guide plate 10.

Thus, since the area occupied by the low refractive index pattern 20 is large near the light incidence surfaces 10S1 and 10S3 of the light guide plate 10, the amount of totally reflected light may be larger than the amount of light emitted toward the upper surface 10a of the light guide plate 10. On the other hand, since the area occupied by the low refractive index pattern 20 is small in the central portion of the light guide plate 10, the amount of light emitted toward the upper surface 10a of the light guide plate 10 may be larger than the amount of totally reflected light. Thus, the amount of guided light is sufficient and total reflection efficiency is high near the light incidence surfaces 10S1 and 10S3 of the light guide plate 10 while the amount of guided light is sufficient and the amount of emitted light is large in the central portion of the light guide plate 10. Accordingly, the total amount of light emitted through the upper surface 10a of the light guide plate 10 near the light incidence surfaces 10S1 and 10S3 may become similar to that in the central portion. As a result, it is possible to improve luminance uniformity by adjusting a ratio of the area occupied by the low refractive index pattern 20 per unit area.

Figure 20:
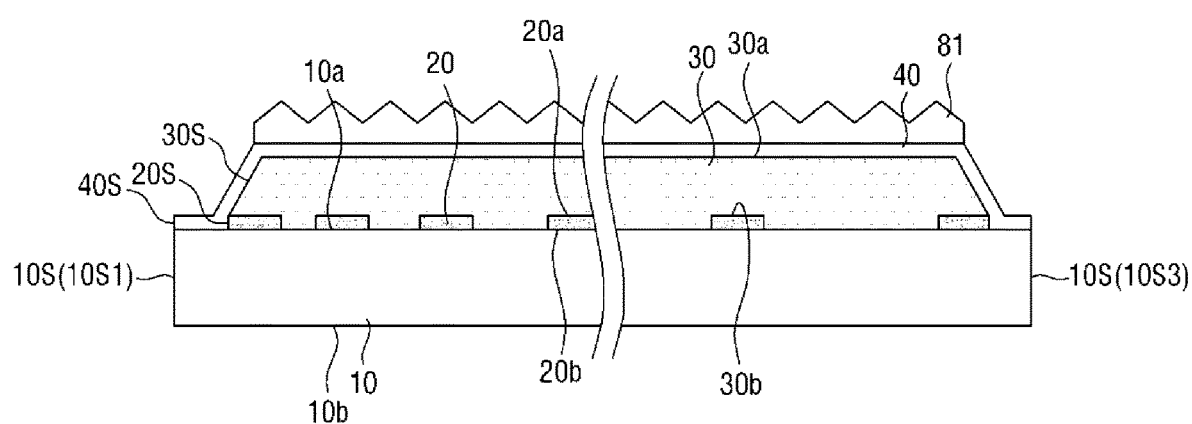
FIG. 20 and FIG. 21 are sectional views of optical members according to still other exemplary embodiments.
Figure 21:
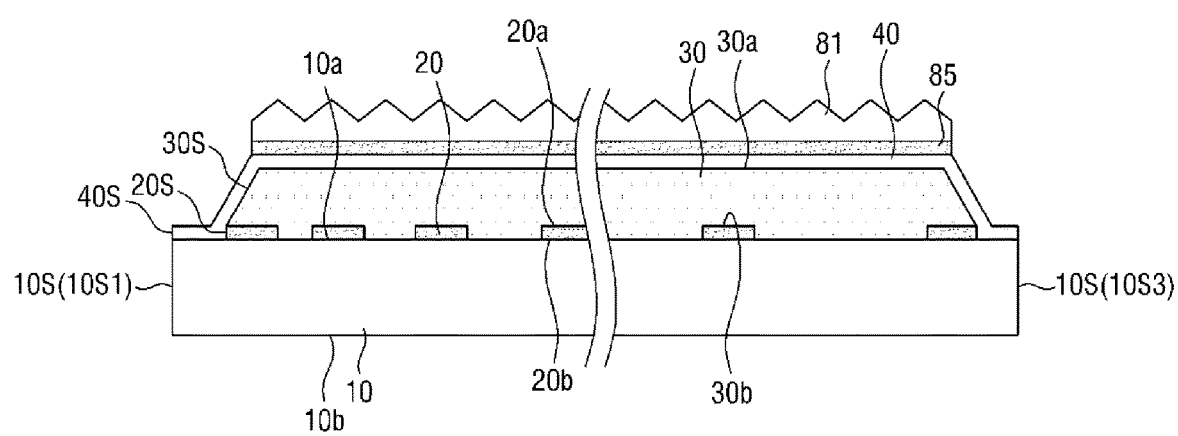

FIGS. 20 and 21 are sectional views of optical members according to still other embodiments. FIGS. 20 and 21 show that an integrated optical function layer may be further included in optical members 111 and 112. The optical function layer is a layer for changing or controlling a propagation direction, a phase, a polarization state, or the like of light. For example, the optical function layer may perform at least one of refraction, condensation, diffusion, scattering, refractive polarization, and phase delay of light. The optical function layer may be a layer for performing the same optical function as that of a prism film, a diffusion film, a microlens film, a lenticular film, a polarizing film, a reflective polarizing film, a phase difference film, or the like provided as a separate film. The optical function layer may include an optical pattern having a structured surface. The optical pattern having a structured surface including an uneven surface. A sectional shape of the uneven surface may be, for example, a polygon such as a triangle and a trapezoid, a portion of a circle or an ellipse, or an amorphous random shape. The uneven surface may be a linear pattern extending in one direction or an independent dot-type pattern. However, the present invention is not limited thereto, and an optical pattern having a structured surface may have a flat surface such as a polarizing film or a reflective polarizing film.

The optical members 111 and 112 include an optical function layer 81 disposed on the passivation layer 40. In the drawings, a prism pattern is illustrated as the optical function layer 81, but a microlens or the above-described other various optical function layers may be used. The optical function layer 81 may be made of a material having a higher refractive index than the low refractive index pattern 20. The refractive index of the optical function layer 81 may range from 1.5 to 1.8, but is not limited thereto.

The optical function layer 81 may be disposed to overlap the wavelength conversion layer 30 located thereunder. A side surface of the optical function layer 81 may be aligned with or recessed relative to the side surface 30s of the wavelength conversion layer 30.

In an exemplary embodiment, the optical function layer 81 may be disposed to be in direct contact with the passivation layer 40, as shown in FIG. 20.

In another exemplary embodiment, the optical function layer 81 may be disposed on the passivation layer 40, as shown in FIG. 21, and a bonding layer 85 may be disposed therebetween. The bonding layer 85 may be made of an adhesive material or a viscous material. As another example, the bonding layer 85 may be made of a double-sided tape. As still another example, the bonding layer 85 may be made of a low refractive material exemplified as a constituent material of the above-described low refractive index pattern 20. The bonding layer 85 may be made of the same material as that of the low refractive index pattern 20. When the bonding layer 85 is made of the low refractive material, an optical interface is formed between the passivation layer 40 and the bonding layer 85 and between the bonding layer 85 and the optical function layer 81, and thus, light modulation such as refraction and reflection may be performed.

Figure 22:
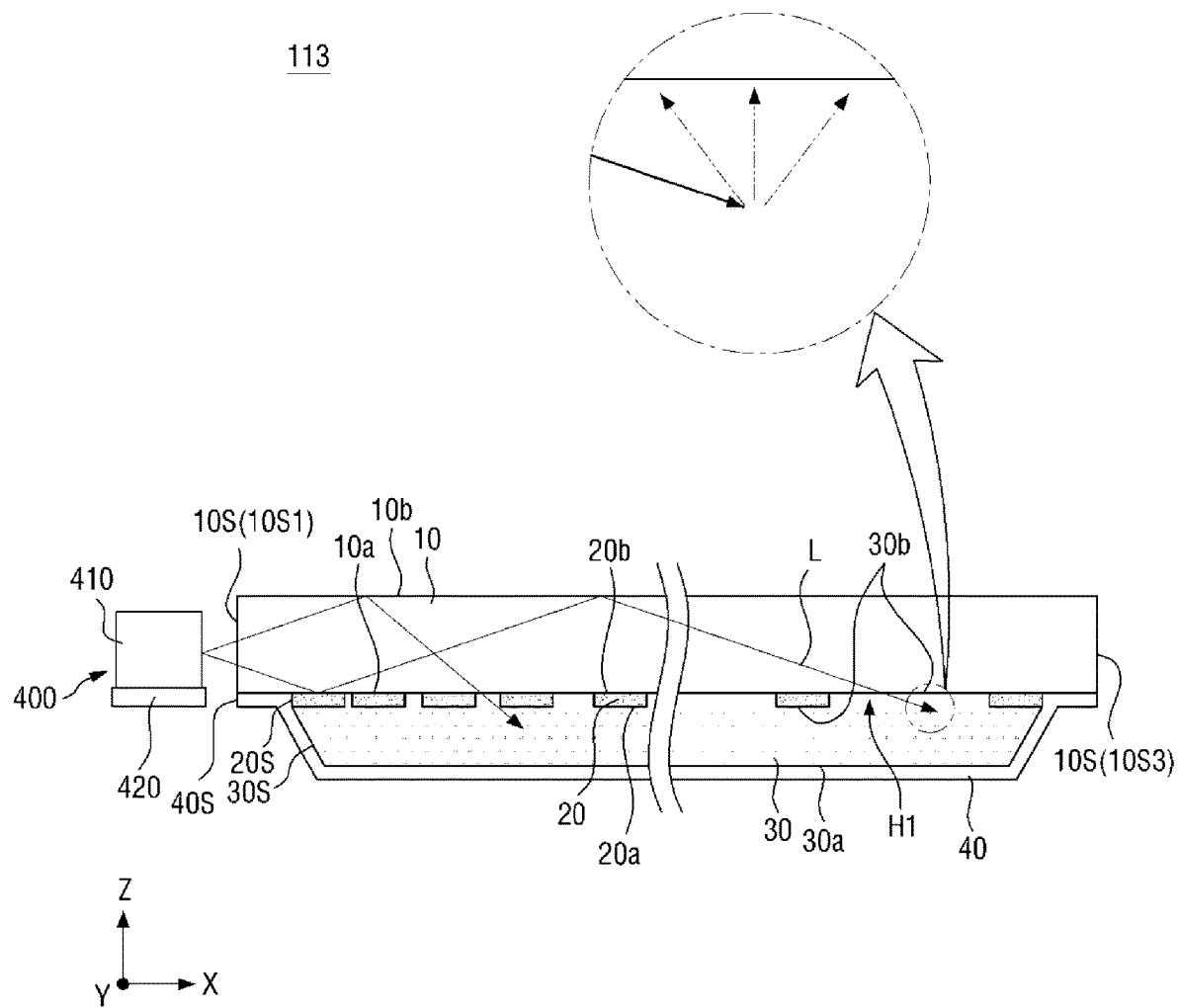
FIG. 22 and FIG. 23 are sectional views of optical members according to still another exemplary embodiment.
Figure 23:
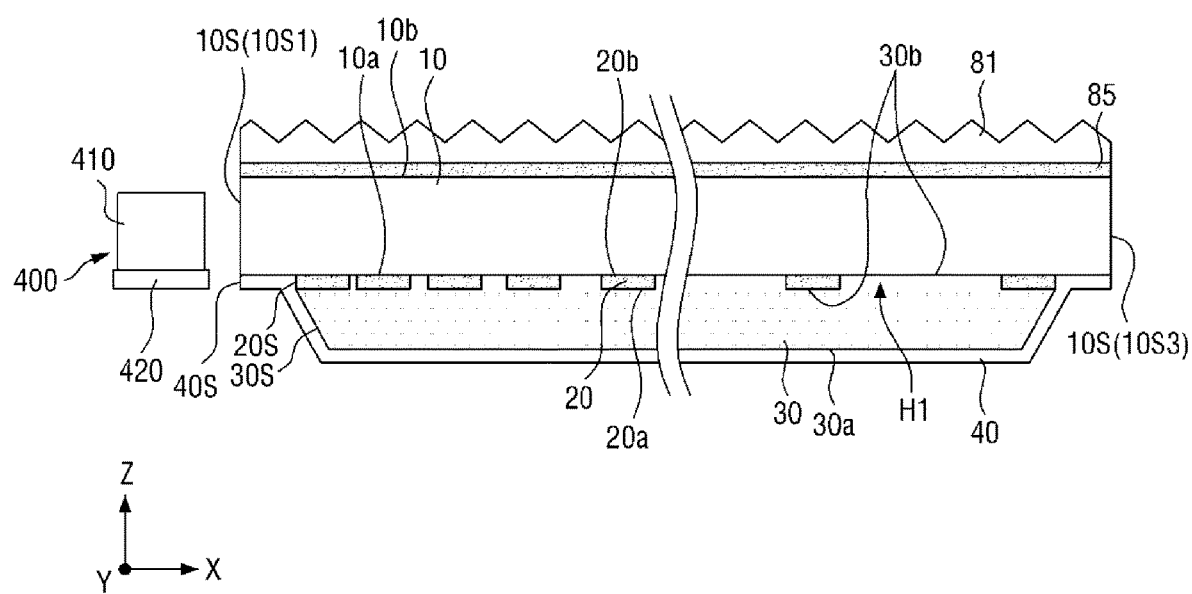

FIGS. 22 and 23 are sectional views of optical members according to still another embodiment. FIGS. 22 and 23 show that, in optical members 113 and 114, the low refractive index pattern 20, the wavelength conversion layer 30, and the passivation layer 40 may be disposed on the lower surface 10b of the light guide plate 10.

The detailed shapes and arrangements of the low refractive index pattern 20, the wavelength conversion layer 30, and the passivation layer 40 of the optical members 100 to 111 of FIGS. 1 to 21 may be applicable as detailed shapes and arrangement of the low refractive index pattern 20, the wavelength conversion layer 30, and the passivation layer 40. That is, even when the low refractive index pattern 20 is disposed on the lower surface 10b of the light guide plate 10, a ratio of an area occupied by the low refractive index pattern 20 per unit area may gradually decrease from the light incidence surface 10S1 to the opposite surface 10S3. In this case, the amount of light emitted through the lower surface 10b of the light guide plate 10 may increase from the light incidence surface 10S1 to the opposite surface 10S3. When the wavelength conversion layer 30 is disposed on the lower surface 10b of the light guide plate 10, color uniformity may increase.

In detail, light traveling toward the opposite surface 10S3 due to being total reflected in the light guide plate 10 may be emitted toward the wavelength conversion layer 30 through the lower surface 10b of the light guide plate 10 at a plane on which the low refractive index pattern 20 is not disposed. As described above, the wavelength conversion layer 30 may include a wavelength conversion particle and a scattering particle. The wavelength conversion particle and the scattering particle have scattering characteristics in which light passed through the particles is emitted in a random direction. Green wavelength light and red wavelength light passed through the wavelength conversion particle and blue wavelength light passed through only the scattering particle are scattered and emitted in random directions. The scattered green wavelength light, red wavelength light, and blue wavelength light may be appropriately mixed to display white light as emitted light. The probability of the green wavelength light, red wavelength light, and blue wavelength light being mixed increases as a distance from the scatting point increases, and thus the green wavelength light, red wavelength light, and blue wavelength light may be appropriately mixed to display the white light as the emitted light such that uniform mixing may be achieved. That is, light is observed as a more uniform color in a direction away from the wavelength conversion layer 30. Accordingly, as a distance between the wavelength conversion layer 30 and a display panel 300 increases, a more uniform color may be observed from the display panel 300 and color uniformity may increase.

The upper surface 10a of the light guide plate 10 may be exposed by an air layer. However, as shown in FIG. 23, the optical function layer 81 may be disposed thereon with the bonding layer 85 made of the low refractive material being interposed therebetween. In this case, the upper surface 10a of the light guide plate 10 may form an optical interface together with the bonding layer 85 having a low refractive index, and thus effective total reflection may be achieved on the upper surface 10a of the light guide plate 10.

The above-described optical members 100 to 114 according to the various exemplary embodiments may be applied to a display device, a lighting device, or the like. Exemplary embodiments of a display device including the optical member will be described in detail below.

Figure 24:
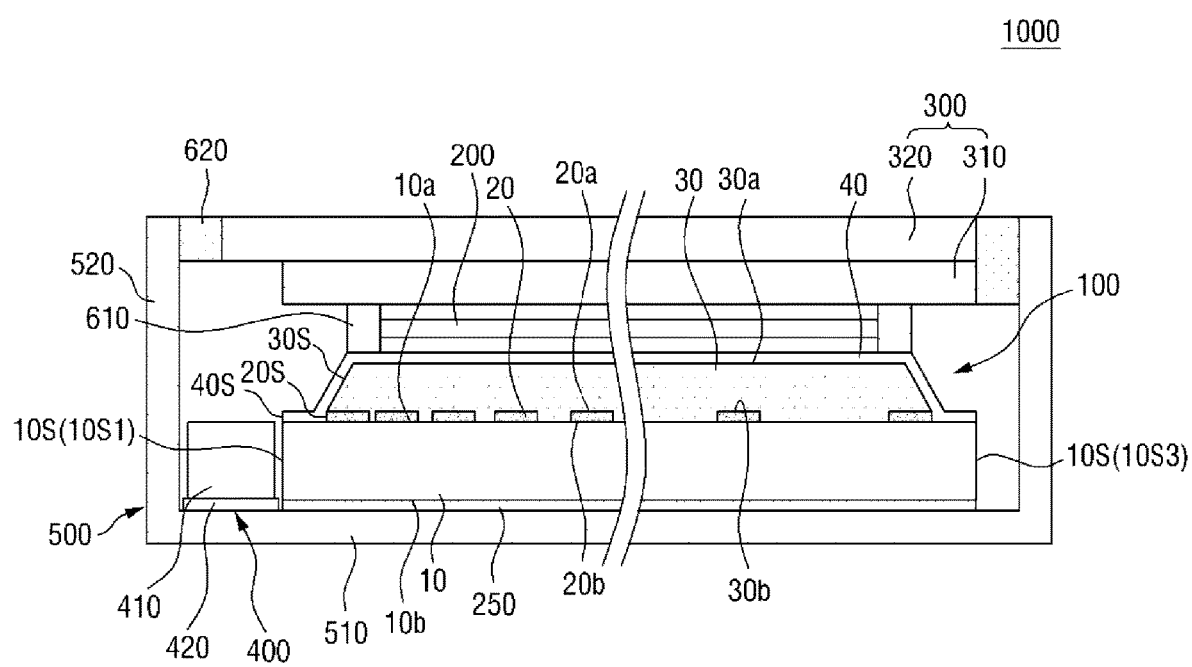
FIG. 24 is a sectional view of a display device according to an exemplary embodiment.

FIG. 24 is a sectional view of a display device according to an exemplary embodiment.

Referring to FIG. 24, a display device 1000 includes a light source 400, an optical member 100 disposed along an emission path of the light source 400, and a display panel 300 disposed on of the optical member 100.

All of the optical members 100 to 112 according to the above-described exemplary embodiments may be used as the optical member. FIG. 24 illustrates the case in which the optical member 100 of FIG. 2 is used.

The light source 400 is disposed at one side of the optical member 100. The light source 400 may be disposed adjacent to a light incidence surface 10S1 of a light guide plate 10 of the optical member 100. The light source 400 may include a plurality of point light sources or line light sources. Each of the point light sources may be a light emitting diode (LED) light source 410. The plurality of LED light sources 410 may be mounted on a printed circuit board 420. The LED light sources 410 may emit blue wavelength light.

In an exemplary embodiment, the LED light source 410 may be a side-emitting LED configured to emit light from a side surface thereof, as shown in FIG. 24. In this case, the printed circuit board 420 may be disposed on a bottom surface 510 of a housing 500. Although not shown, in another exemplary embodiment, the LED light source 410 may be a top-emitting LED configured to emit light upward. In this case, the printed circuit board 420 may be disposed on a side wall 520 of the housing 500.

The blue wavelength light emitted from the LED light source 410 is incident on the light guide plate 10 of the optical member 100. The light guide plate 10 of the optical member 100 guides light and emits the guided light through the upper surface 10a or a lower surface 10b of the light guide plate 10. A wavelength conversion layer 30 of the optical member 100 converts a portion of the blue wavelength light incident on the light guide plate 10 into light having other wavelengths, for example, green wavelength light and red wavelength light. The converted green wavelength light and red wavelength light and unconverted blue wavelength light are emitted outward and provided to the display panel 300.

The display device 1000 may further include a reflective member 250 disposed under the optical member 100. The reflective member 250 may include a reflective film or a reflective coating layer. The reflective member 250 reflects light emitted from the lower surface 10b of the light guide plate 10 of the optical member 100 and allows the reflected light to reenter the light guide plate 10.

The display panel 300 may be disposed on the optical member 100. The display panel 300 may receive light from the optical member 100 and display the received light on a screen thereof. Examples of a light-receiving display panel configured to receive light and display the received light on a screen thereof may include a liquid crystal display panel, an electrophoretic panel, and the like. The liquid crystal display panel will be described as the display panel, but is not limited thereto. Other various light-receiving display panels may be used.

The display panel 300 may include a first substrate 310, a second substrate 320 facing the first substrate 310, and a liquid crystal layer (not shown) disposed between the first substrate 310 and the second substrate 320. The first substrate 310 and the second substrate 320 overlap each other. In an exemplary embodiment, any one of the substrates may be larger than the other substrate to protrude toward the outside relative to the other substrate. FIG. 24 shows that the second substrate 320, which is located at an upper portion, is larger and protrudes from a side surface in which the light source 400 is disposed. A protruding region of the second substrate 320 may provide a space on which a driving chip or an external circuit board is mounted. Unlike the illustrated example, the first substrate 310, which is located at a lower portion, may be larger than the second substrate 320 to protrude outward. An area of the display panel 300 at which the first substrate 310 overlaps the second substrate 320 other than the protruding region may be substantially aligned with the side surface 10S of the light guide plate 10 of the optical member 100.

The optical member 100 may be combined with the display panel 300 through a module bonding member 610. The module bonding member 610 may be formed in the shape of a planar quadrangular frame. The module bonding member 610 may be located at an edge portion of each of the display panel 300 and the optical member 100.

In an exemplary embodiment, a lower surface of the module bonding member 610 may be disposed on the passivation layer 40. The lower surface of the module bonding member 610 may be disposed on the passivation layer 40 to overlap an upper surface 30a of the wavelength conversion layer 30 but not a side surface 30s thereof.

The module bonding member 610 may include a polymer resin, an adhesive tape, a viscous tape, or the like. The module bonding member 610 may perform a light transmission blocking function by including a light absorption material, such as a black pigment or dye, or by including a reflective material.

The display device 1000 may further include the housing 500. The housing 500 has one open surface and includes the bottom surface 510 and the side wall 520 connected with the bottom surface 510. The light source 400, an attaching body of the optical member 100/display panel 300, and the reflective member 250 may be housed in a space defined by the bottom surface 510 and the side wall 520. The light source 400, the reflective member 250, and the attaching body of the optical member 100/display panel 300 may be disposed on the bottom surface 510 of the housing 500. The side wall 520 of the housing 500 may have substantially the same height as the attaching body of the optical member 100/display panel 300 located inside the housing 500. The display panel 300 may be disposed adjacent to the top of the side wall of the housing 500, and the display panel 300 and the housing 500 may be combined with each other by the housing bonding member 620. The housing bonding member 620 may be formed in the shape of a planar quadrangular frame. The housing bonding member 620 may include a polymer resin, an adhesive tape, a viscous tape, or the like.

The display device 1000 may further include at least one optical film 200. The at least one optical film 200 may be housed in a space disposed between the optical member 100 and the display panel 300 and surrounded by the module bonding member 610. A side surface of the at least one optical film 200 may be in contact with and attached to an inner surface of the module bonding member 610. FIG. 24 illustrates the case in which the optical film 200 is spaced apart from the optical member 100 and the display panel 300, but separation spaces are not essentially required.

The optical film 200 may be a prism film, a diffusion film, a microlens film, a lenticular film, a polarizing film, a reflective polarizing film, a phase difference film, or the like. The display device 1000 may include a plurality of the same type or different types of optical films 200. When the plurality of optical films 200 are used, the optical films 200 may be disposed to overlap each other, and side surfaces of the optical films 200 may be in contact with and attached to the inner surface of the module bonding member 610. The optical films 200 may be spaced apart from each other, and an air layer may be disposed therebetween.

In an exemplary embodiment, a composite film into which two or more optical function layers are integrated may be used as each of the optical films 200. This will be described in detail with reference to FIG. 25.

Figure 25:
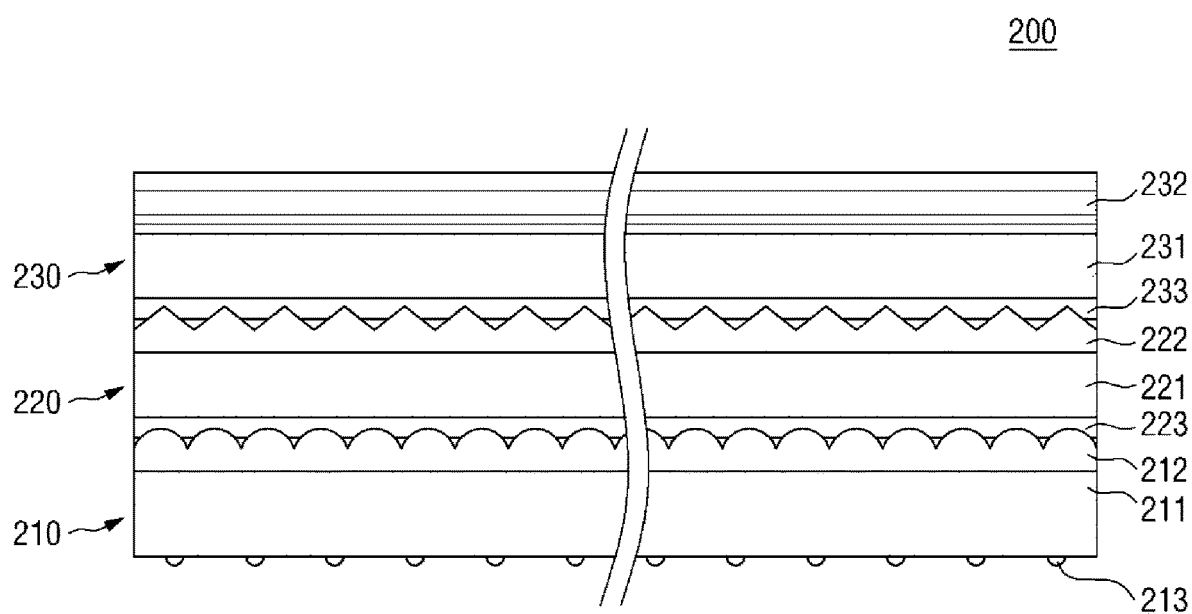
FIG. 25 is a sectional view of an optical film according to an exemplary embodiment.

FIG. 25 is a sectional view of an optical film according to an exemplary embodiment. Referring to FIG. 25, an example optical film 200 may include a first film 210, a second film 220, and a third film 230 which are integrated.

The first film 210 may include a first member 211, a back-coating layer 213 disposed on the bottom of the first member 211, and a first optical pattern layer 212 disposed on top of the first member 211. When the optical film 200 is spaced apart from the optical member 100, the back-coating layer 213 may be omitted.

The second film 220 may include a second member 221, a first bonding resin layer 223 disposed on the bottom of the second member 221, and a second optical pattern layer 222 disposed on top of the second member 221.

The third film 230 may include a third member 231, a second bonding resin layer 233 disposed on the bottom of the third member 231, and an optical layer 232 disposed on top of the third member 231.

The first optical pattern layer 212 includes convex portions and concave portions, and some of the convex portions are in contact with the first bonding resin layer 223 or partially penetrate into and are combined with the first bonding resin layer 223. An air layer is disposed between the first bonding resin layer 223 and the concave portions of the first optical pattern layer 212.

The second optical pattern layer 222 includes convex portions and concave portions, and some of the convex portions are in contact with the second bonding resin layer 233 or partially penetrate into and are combined with the second bonding resin layer 233. An air layer is disposed between the second bonding resin layer 233 and the concave portions of the second optical pattern layer 222.

For example, the first optical pattern layer 212 may be a microlens pattern layer or a diffusion layer, the second optical pattern layer 222 may be a prism pattern layer, and the optical layer 232 of the third film 230 is a reflective polarizing layer. In another example, the first optical pattern layer 212 is a prism pattern layer, the second optical pattern layer 222 is a prism pattern layer (crossing the prism pattern of the first optical pattern layer in an extending direction), and the optical layer 232 of the third film 230 is a reflective polarizing layer. In the exemplary embodiments, the third member 231 of the third film 230 may be omitted, and the second bonding resin layer 233 may be disposed on the bottom of the optical layer 232. In addition, other various optical function layers may be used as the first optical pattern layer 212, the second optical pattern layer 222, and the optical layer 232. Also, two films or four or more films may be integrated and used.

When the optical members 111, 112, and 114 including an integrated optical function layer are used as an optical member like in the embodiments of FIG. 20, 21, or 23, all or some of the optical films 200 that perform duplicated optical functions may be omitted.

Figure 26:
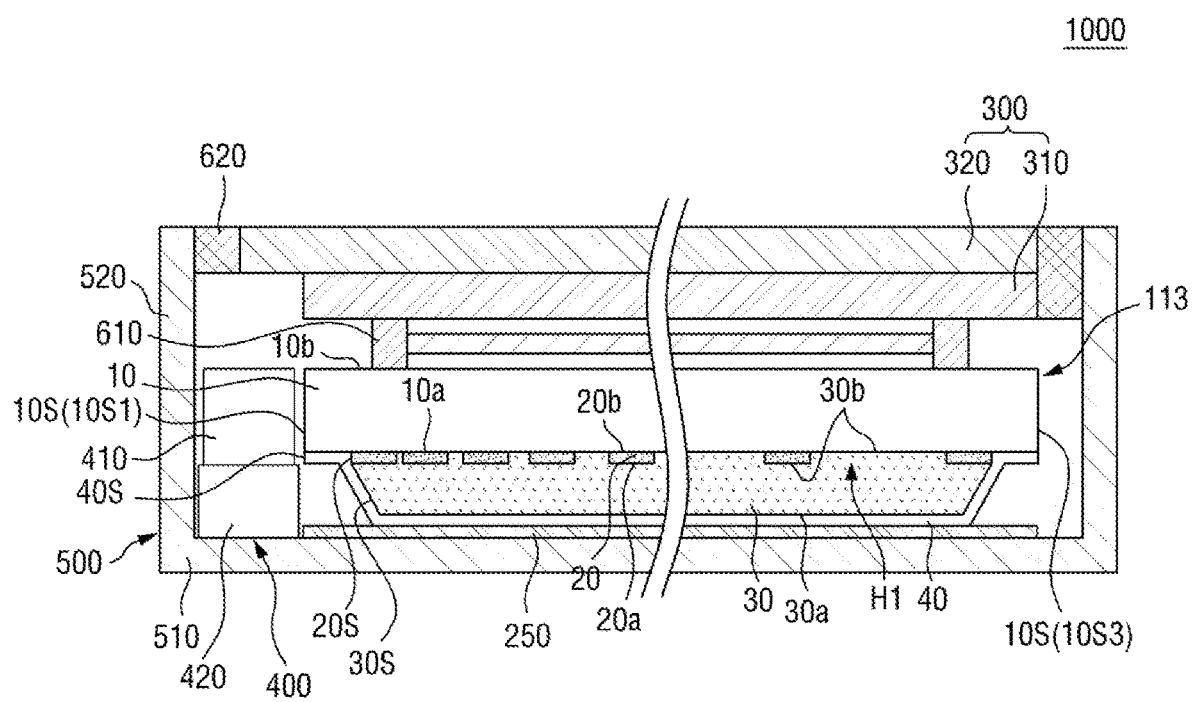
FIG. 26 is a sectional view of a display device according to another exemplary embodiment.

FIG. 26 is a sectional view of a display device according to another exemplary embodiment.

FIG. 26 shows that the optical member 113 of FIG. 22 may be applied to a display device 1001. It should be appreciated that the optical member 113 of FIG. 23 may be used.

A passivation layer 40 of the display device 1001 may be disposed to be in direct contact with a reflective member 250.

A region of a light source 400 from which light substantially originates may be disposed to correspond to a light incidence surface 10S1 of a light guide plate 10. Since a low refractive index pattern 20, a wavelength conversion layer 30, and the passivation layer 40 are disposed on a lower surface 10b of the light guide plate 10, the display device 1001 may have a height increasing from a bottom surface 510 of a housing 500 to the lower surface 10b of the light guide plate 10. As the light source 400, an LED light source 410 configured to substantially emit light may be disposed adjacent to the light incidence surface 10S1 of the light guide plate 10 by adjusting a height of a printed circuit board 420. Also, as shown in FIG. 26, the sum of thicknesses of the low refractive index pattern 20, the wavelength conversion layer 30, and the passivation layer 40 is illustrated as being similar to a thickness of the light guide plate 10 for convenience of understanding. However, the thickness of the light guide plate 10 is actually in the range of several millimeters while the sum of the thicknesses of the low refractive index pattern 20, and the wavelength conversion layer 30, and the passivation layer 40 is actually in the range of several micrometers. Accordingly, a position of the lower surface 10b of the light guide plate 10 does not significantly rise.

A module bonding member 610 may be combined with an upper surface 10a of the light guide plate 10. In a region of the upper surface 10a in contact with the module bonding member 610, total reflection efficiency of the upper surface 10a of the light guide plate 10 may decrease. In this case, the module bonding member 610 may perform the light transmission blocking function, as described above, to block light emitted toward the upper surface 10a of the light guide plate 10.

With the optical member according to exemplary embodiments, it is possible to perform both a light guide function and a wavelength conversion function by using a single integrated member, and it is also possible for a sealing structure to prevent deterioration of a wavelength conversion layer. The single integrated member has a relatively small thickness, and thus, can simplify a process of assembling a display device.

The advantageous effects of the present invention are not limited to the above-description, and various other effects are included in this specification.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member comprising:
a light guide plate including a surface disposed on a plane defined by a first direction and a second direction crossing the first direction;
a refractive pattern disposed on the surface of the light guide plate and including an opening for exposing the surface of the light guide plate;
a wavelength conversion layer disposed on the refractive pattern; and
a passivation layer disposed on the wavelength conversion layer and configured to cover an upper surface of the wavelength conversion layer, the passivation layer overlapping the refractive pattern,
wherein:
the refractive pattern has a lower index of refraction than the light guide plate; and
a ratio of an area occupied by the refractive pattern to an area of the surface of the light guide plate decreases in the first direction.

2. The optical member of claim 1, wherein:
the refractive pattern comprises a plurality of particles and a matrix including an organic material; and
the plurality of particles are dispersed in the matrix.

3. The optical member of claim 2, wherein:
the refractive pattern further comprises a plurality of voids; and
the matrix fully surrounds each of the plurality of voids.

4. The optical member of claim 3, wherein a refractive index of one of the plurality of voids and a refractive index of one of the plurality of particles are different from each other.

5. The optical member of claim 1, wherein the opening is a through-hole extending through the refractive pattern in a third direction perpendicular to the surface of the light guide plate.

6. The optical member of claim 5, further comprising a plurality of the through-holes, wherein the plurality of through-holes have an arrangement density gradually increasing in the first direction.

7. The optical member of claim 5, further comprising a plurality of the through-holes having a planar area gradually increasing in the first direction.

8. The optical member of claim 1, further comprising a plurality of the refractive patterns spaced apart from each other to form the opening.

9. The optical member of claim 8, wherein each of the plurality of refractive patterns has a planar area gradually decreasing in the first direction.

10. The optical member of claim 9, wherein the wavelength conversion layer has an area in contact with the surface of the light guide plate, and the area gradually increases in the first direction.

11. The optical member of claim 1, wherein the light guide plate comprises an inorganic material.

12. The optical member of claim 11, wherein a difference between a refractive index of the light guide plate and a refractive index of the refractive pattern is 0.2 or more.

13. The optical member of claim 12, wherein the wavelength conversion layer has a higher refractive index than the refractive pattern.

14. An optical member comprising:
a light guide plate including a surface, a first side surface crossing the surface, and a second surface opposite the first side surface;
a refractive pattern disposed on the surface of the light guide plate and comprising an opening for exposing the surface of the light guide plate;
a wavelength conversion layer disposed on the refractive pattern; and
a passivation layer disposed on the wavelength conversion layer and covering an upper surface of the wavelength conversion layer, the passivation layer overlapping the refractive pattern,
wherein:
the refractive pattern has a lower index of refraction than the light guide plate;
the refractive pattern further comprises a plurality of voids and a matrix including an organic material; and
the matrix fully surrounds each of the plurality of voids.

15. The optical member of claim 14, wherein a ratio of an area occupied by the refractive pattern to an area of the surface of the light guide plate decreases in a direction away from the second side surface.

16. The optical member of claim 15, wherein the wavelength conversion layer has a higher refractive index than the refractive pattern.

17. A display device comprising:
an optical member comprising,
a light guide plate including a light incidence surface;
a refractive layer disposed on the light guide plate and having a lower index of refraction than the light guide plate;
a wavelength conversion layer disposed on the refractive layer; and
a passivation layer disposed on the wavelength conversion layer and covering an upper surface of the wavelength conversion layer, the passivation layer overlapping the refractive layer;
a light source disposed at a side of the light incidence surface of the light guide plate; and
a display panel disposed on the optical member,
wherein the refractive layer comprises patterns, and an area in which the refractive layer is disposed decreases in a direction away from the light incidence surface.

18. The display device of claim 17, further comprising a reflective member disposed under the optical member,
wherein the wavelength conversion layer is disposed between the light guide plate and the display panel.

19. The display device of claim 17, further comprising a reflective member disposed under the optical member,
wherein the wavelength conversion layer is disposed between the light guide plate and the reflective member.

* * * * *